(12) United States Patent
Mcalister et al.

(10) Patent No.: US 10,891,267 B2
(45) Date of Patent: *Jan. 12, 2021

(54) VERSIONING OF DATABASE PARTITION MAPS

(71) Applicant: Amazon Technologies, Inc., Seattle, WA (US)

(72) Inventors: Grant Alexander MacDonald Mcalister, Seattle, WA (US); Swaminathan Sivasubramanian, Sammamish, WA (US); Rajesh Sudhakar Sheth, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 688 days.

This patent is subject to a terminal disclaimer.

(21) Appl. No.: 15/420,010

(22) Filed: Jan. 30, 2017

(65) Prior Publication Data

US 2017/0139910 A1 May 18, 2017

Related U.S. Application Data

(63) Continuation of application No. 13/781,345, filed on Feb. 28, 2013, now Pat. No. 9,558,207, which is a
(Continued)

(51) Int. Cl.
*G06F 16/18* (2019.01)
*G06F 16/27* (2019.01)
(Continued)

(52) U.S. Cl.
CPC ...... *G06F 16/1873* (2019.01); *G06F 16/1727* (2019.01); *G06F 16/278* (2019.01); *G06F 3/0644* (2013.01)

(58) Field of Classification Search
None
See application file for complete search history.

(56) References Cited

U.S. PATENT DOCUMENTS 5,774,668 A  6/1998  Choquier et al.
5,815,649 A * 9/1998  Utter .................. G06F 11/2071
                                           709/215
(Continued)

OTHER PUBLICATIONS

Hacigumus, et al., "Providing Database as a Service", Aug. 7, 2002, 2002 IEEE International Conference on Data Engineering (ICDE), pp. 1-10.

*Primary Examiner* — Uyen T Le
(74) *Attorney, Agent, or Firm* — Robert C. Kowert; Kowert, Hood, Munyon, Rankin & Goetzel, P.C.

(57) ABSTRACT

System and methods for managing versions of partition maps in a distributed data store are disclosed. A relational database may use partition maps to indicate the location of data in a particular partition, or in a replica thereof. These partition maps may be versioned using a two-stage mechanism in which partition map updates are communicated to all nodes, or to affected nodes only, and in which operation may continue without waiting for acknowledgment of their application to each node. The system may handle minor partition changes differently than major partition changes. For example, if a replica of a partition is promoted to be a primary copy due to hardware or network failures, partition map changes may only be propagated to nodes in the same replica group. For major partition changes (e.g., splits, moves, mergers, added partitions, or size change), a new partition map may be made available to all nodes.

20 Claims, 12 Drawing Sheets

Related U.S. Application Data continuation of application No. 12/059,738, filed on Mar. 31, 2008, now Pat. No. 8,392,482.

(51) Int. Cl.
*G06F 16/17* (2019.01)
*G06F 3/06* (2006.01)

(56) References Cited

U.S. PATENT DOCUMENTS

| | | | |
|---|---|---|---|
| 6,003,024 A | 12/1999 | Bair et al. | |
| 6,125,370 A * | 9/2000 | Courter | G06F 16/278 |
| 6,154,766 A | 11/2000 | Yost et al. | |
| 6,351,775 B1 | 2/2002 | Yu | |
| 6,539,381 B1 * | 3/2003 | Prasad | G06F 16/27 |
| 6,553,366 B1 | 4/2003 | Miller et al. | |
| 6,567,796 B1 | 5/2003 | Yost et al. | |
| 7,171,420 B2 | 1/2007 | Iyer et al. | |
| 7,246,706 B1 | 7/2007 | Shakes et al. | |
| 7,305,451 B2 | 12/2007 | San Andres et al. | |
| 7,415,106 B2 | 8/2008 | Chang | |
| 7,516,848 B1 | 4/2009 | Shakes et al. | |
| 7,555,493 B2 | 6/2009 | Khayter et al. | |
| 7,574,424 B2 | 8/2009 | Chowdhuri | |
| 7,647,329 B1 | 1/2010 | Fischman et al. | |
| 7,676,551 B1 | 3/2010 | Dalia et al. | |
| 7,685,109 B1 | 3/2010 | Ransil et al. | |
| 7,716,662 B2 | 5/2010 | Seiden | |
| 8,060,792 B2 | 11/2011 | Sivasubramanian et al. | |
| 8,380,738 B2 | 2/2013 | Tatemura et al. | |
| 8,386,540 B1 | 2/2013 | McAlister et al. | |
| 8,392,482 B1 | 3/2013 | McAlister et al. | |
| 8,694,472 B2 * | 4/2014 | Marshall | G06F 16/2282 707/659 |
| 9,558,207 B1 | 1/2017 | McAlister et al. | |
| 2002/0091702 A1 * | 7/2002 | Mullins | G06F 16/25 |
| 2003/0135479 A1 | 7/2003 | Hacigumus et al. | |
| 2004/0111410 A1 | 6/2004 | Burgoon et al. | |
| 2004/0243799 A1 | 12/2004 | Hacigumus et al. | |
| 2004/0243816 A1 | 12/2004 | Hacigumus et al. | |
| 2005/0262129 A1 | 11/2005 | Hacigumus et al. | |
| 2007/0162506 A1 | 7/2007 | Grosman et al. | |
| 2007/0226177 A1 | 9/2007 | Barsness et al. | |
| 2008/0034259 A1 * | 2/2008 | Ko | G06F 11/1441 714/718 |
| 2008/0104141 A1 | 5/2008 | Mcmahon | |
| 2008/0109466 A1 | 5/2008 | Havens et al. | |
| 2008/0294713 A1 | 11/2008 | Saylor et al. | |
| 2009/0157762 A1 | 6/2009 | Yerneni et al. | |
| 2011/0282832 A1 * | 11/2011 | Rishel | G06F 9/5083 707/609 |
| 2012/0265744 A1 | 10/2012 | Berkowitz et al. | |

* cited by examiner

VERSIONING OF DATABASE PARTITION MAPS

This application is a continuation of U.S. application Ser. No. 13/781,345, filed Feb. 28, 2013, now U.S. Pat. No. 9,558,207, which is a continuation of U.S. application Ser. No. 12/059,738, filed Mar. 31, 2008, now U.S. Pat. No. 8,392,482, which are hereby incorporated by reference herein in their entirety.

BACKGROUND

Database systems managing large amounts of data may distribute and/or replicate that data across two or more machines, often in different locations, for any of a number of reasons, including security issues, disaster prevention and recovery issues, data locality and availability issues, etc. These machines may be configured in any number of ways, including as a shared resource pool, such as in a grid computing architecture.

Interaction between client applications and database servers typically includes read operations (read-only queries), write operations (to store data), and update operations that can be conceptualized using a read-modify-write workflow consisting of the following steps:

The client application reads data from the database server (via a query).

The client application applies business logic and derives new or modified data.

The client application writes data back to the database server.

Distributed relational database systems typically divide data into two or more partitions according to a partition key. Partitions may be stored on different nodes in the distributed system, and may be replicated on one or more other nodes. When changes are made to the partitioning, such a system is typically unavailable until the changes are completed and propagated across the system.

Figure 1:
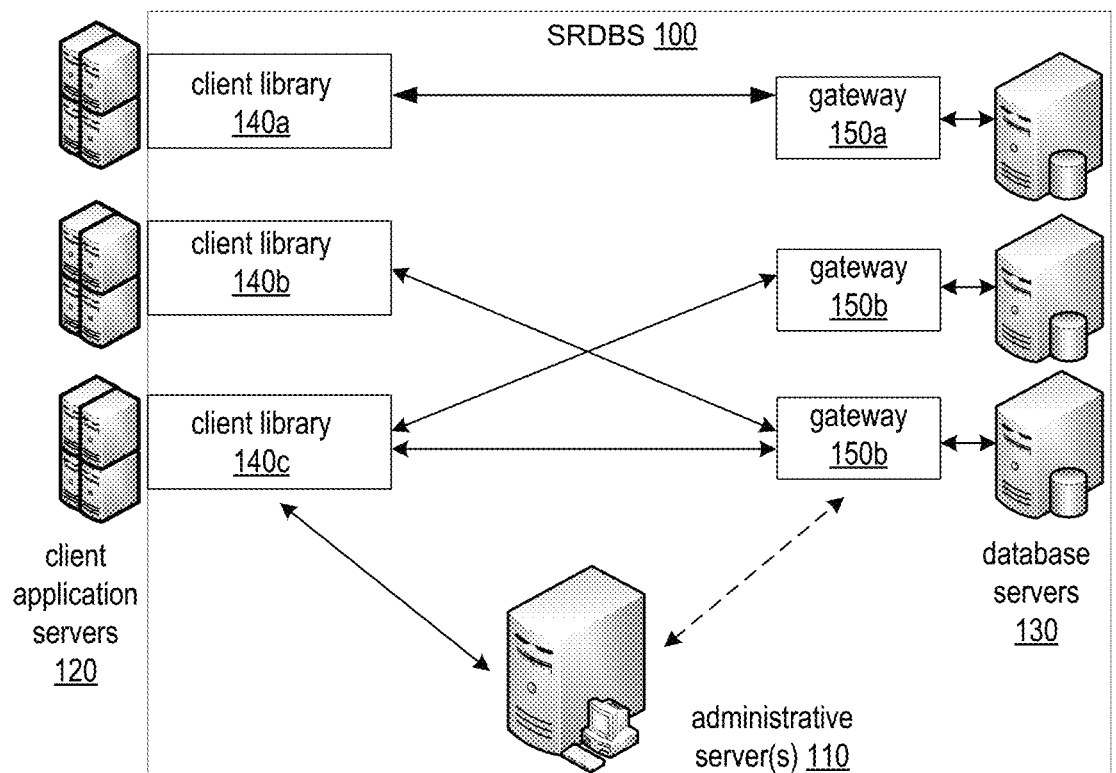
FIG. 1 is a diagram illustrating interactions between various components of an SRDBS implementation, according to one embodiment.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

A system and methods for providing a Scalable Relational Database Service (SRDBS) are disclosed. In various embodiments, the service includes the use of Relational Database Management System (RDBMS) as a utility, allowing users (which may also be referred to as "subscribers") to "lease" a virtual relational database (also known as a "namespace"). The leased namespace may resemble a physical RDBMS, and may allow clients to perform queries (e.g., SQL queries). In some embodiments the service allows users to lease a virtual database having a specified allocation of memory, CPU, and/or I/O resources. Allowing developers to lease a virtual relational database may allow them to focus on their own development work, rather than having to install, configure, support, and/or maintain a physical database of their own.

In various embodiments, a system providing SRDBS may partition a user's database across multiple database servers automatically and may replicate each partition automatically. This may provide incremental scalability and high availability for users of the virtual database. Such a system may also free software teams from worrying about scalability and availability related issues when developing their applications.

An SRDBS implementation may provide automatic routing of client queries to the appropriate databases. For example, in one embodiment, SRDBS's query routing mechanism may automatically route a client's queries to the appropriate database server that holds the required data. This routing process may mask temporary data outages that may arise due to database replica failures or repartitioning of a client's data. To instruct clients of the location of required data, SRDBS may in some embodiments employ a partition map that conveys the location of data. In one embodiment, to reflect the changes in data location due to server outages and data repartitioning, SRBBS may use a multi-versioning scheme for partition maps that instructs clients to route their queries to the appropriate server. In some embodiments, SRDBS may employ a resource isolation mechanism that limits the CPU and I/O utilization of each namespace to a desired limit. These features are described in more detail herein.

As noted above, a Scalable Relational Database Service may provide RDBMS as a service in a utility computing fashion. By taking advantage of RDBMS as a service, software teams may be freed of operational duties, thereby increasing their business productivity. For example, the use of SRDBS may decrease the time incurred by a development team for installing and running a new database with their desired schemas. SRDBS may also free the development teams from the worries of database availability and durability, as it handles the process of database replication on their behalf. Note that while the examples included herein describe physical replication of data (which may be more efficient for managing changes in various embodiments), in other embodiments a logical replication may be suitable for use with the underlying database engine. In various embodiments, SRDBS may support partition-aware database-driven applications so that RDBMS can be scaled to multiple servers. The use of SRDBS may improve the hardware efficiency of applications as applications share the database servers. For example, in one embodiment, a fleet of servers may run at 50% utilization when measured at the $95^{th}$ percentile.

SRDBS may in some embodiments be used within a single organization to maximize resource utilization across different teams or projects, or may be used to provide a service to one or more teams or projects external to the organization providing the service. For example, subscribers to such a service may lease or rent a virtual database (i.e., namespace) that is smaller than what they might have had to purchase to support their project(s). The costs of hardware and/or software resources for an SRDBS implementation may be amortized over multiple such namespaces stored by each replica group, each of which may belong to different teams, projects, organizations, and/or subscribers. In some embodiments, a subscriber may use the service during development of a database application in order to test its partitioning approach (i.e., to test the performance given different partitioning keys, primary keys, and foreign keys), to test its query approach (i.e., its approach to query planning and execution), or to determine resource utilization and/or requirements for the application, all before committing to the purchase of hardware and/or software resources. In such embodiments, once the database application is tested using SRDBS, it may be deployed using SRDBS or another database (e.g., a stand-alone RDBMS). In addition, the use of SRDBS may abstract away the specific type and/or configuration of underlying hardware and/or software (e.g., database engines) from application developers and/or users of those applications, and may allow them to be executed on any suitable hardware and/or software platform by the service, transparent to the developers and/or users. In fact, in some embodiments, SRDBS may be implemented using a heterogeneous collection of hardware and/or software components, which may include multiple types of database servers and/or database engines. In various embodiments, SRDBS may be implemented as a platform-independent service, with little or no exposure to administrative features of an underlying database platform. In addition, SRDBS may support a variety of client languages (e.g., in different client libraries), in some embodiments.

The system and methods described herein may provide a service that supports the commonly used database APIs, allowing developers to quickly create applications that need a relational data store. In some embodiments, SRDBS may provide the same interface and query semantics as developers already use with their own databases (e.g., those implemented using Oracle RDBMS from Oracle, Inc., or open source MySQL® databases). In other embodiments, SRDBS may provide different kinds of interfaces (e.g., web and command line interfaces) that allow developers to create new schemas and objects without needing database administrator (DBA) support. This may dramatically shrink the time software development engineers spend developing and deploying new data centric applications, thus helping development teams realize their business goals faster. By operating as a service, SRDBS may isolate the runtime complexity of managing durable, scalable and secured RDBMS, allowing business units to focus on innovation rather than operations. Although the use of SRDBS may remove the need to do operational support of the core RDBMS, in some embodiments developers may still be responsible for designing and deploying their schema.

As noted above, in SRDBS, a developer may store his or her data in a namespace, and each namespace may be conceptually seen as a virtual database. In some embodiments, SRDBS may require the developer to choose a partition key for a namespace, by which all tables in the namespace would be partitioned. For example, in some embodiments the partition key may include a customer identifier, order number, or other significant parameter by which all data in the namespace would be partitioned. Because SRDBS may automatically partition the namespaces across multiple servers and support seamless repartitioning, application developers may not have to be concerned about scaling for CPU, I/O or disk space. As noted above, each partition may be replicated across multiple database servers, which may be called a replica group. This replication may be done for various reasons, such as to increase availability, durability and performance. For example, in some embodiments, a primary copy of each partition may be the only writable copy of the partition, and all writes directed to that partition may be routed to the primary copy. In such embodiments, other copies maintained in the replica group may serve as read-only copies, and read-only queries directed to the partition may be routed to these copies, off-loading work from the primary copy. By partitioning the data over multiple servers, SRDBS may in some embodiments limit the service impact during a single database failure or heavy read workload. In addition, a seamless repartitioning feature may allow applications to scale to thousands of transactions per second and terabytes of data.

In various embodiments, the service described herein may support most or all relational database features within a single partition space. In some embodiments, a subset of operations, such as global joins, may not be supported. The service may also provide utilities to allow high-speed data loading and/or unloading to enable users to easily migrate to the service from another database system. Additionally, in some embodiments, users may be able to access utilization metrics and tuning information with the ability to drill down into details. This may allow service owners to better manage their total cost of ownership and capacity without having to directly deal with hardware allocation. Users of the service may in some embodiments have an option to register for backup and recovery services for maintenance of their namespace(s).

In some embodiments, SRDBS may provide strong consistency by default. In addition, windowed read consistency may be supported in some embodiments by spreading the read workload across the appropriate replica group. Using this model, clients may issue queries specifying, in effect, "it is acceptable to execute this read-only query on a database provided it is executed on data that is no older than the requested time window". For example, a client application may accept data from a read-only copy that is no more than 10 seconds old, (e.g., that has been refreshed and/or checked for consistency within the last 10 seconds). By using the windowed consistency mode, client applications may in some embodiments improve their read latency and read availability.

In some embodiments, an SRDBS implementation may use a commercially available database application (e.g., SQL) as its interface. In such embodiments, SRDBS users may benefit from availability and durability of the underlying RDBMS. In various embodiments, the SRDBS implementation may include limitations and/or conventions placed on an underlying commercial database. An SRDBS implementation may in some embodiments use an industry standard database API (e.g., JavaDatabaseConnectivity, or JDBC) to facilitate adoption by developers. In such embodiments, a client application may see what appears to be a standard driver interface to SRDBS, and the client may only interact with the service through this interface. Such an implementation may allow developers to easily create new schemas and objects, and client applications with interfaces familiar to users. As will be described in more detail herein, SRDBS may provide resource management and isolation of namespaces, and may manage partitioning and query routing, given a subscriber's schema definition and a partitioning key. An SRDBS implementation may in some embodiments partition namespaces across multiple systems for availability and durability, and may support repartitioning for high scalability. In some embodiments, SRDBS may provide strong or eventual consistency depending on the particular query requests. An SRDBS implementation may provide seamless mechanisms for routing queries from clients to partitioned database servers, and may also handle different kinds of failures, such as server failures and network outages. The use of SRDBS may in some embodiments allow subscribers to minimize their total cost of ownership through better utilization of available capacity (hardware and software resources), reduced administration costs, reduced development costs through ease of use, and ease and speed of execution for users.

The functionalities described herein may in some embodiments be provided in SRDBS by the following four logical components: an administrative tier, a client-side routing tier, a gateway tier, and a database tier. These components are illustrated in FIG. 1. As illustrated in FIG. 1, an SRDBS implementation 100 may include one or more administrative servers 110, one or more client libraries 140, one or more gateways 150, and one or more database servers 130. In the example illustrated in FIG. 1, each gateway 150 supports a respective database server 130, and each client library 140 supports interaction with a respective external client application server 120. However, in other embodiments, these components may exhibit a different relationship than the one-to-one model illustrated. It should be understood that the SRDBS 100 system illustrated in FIG. 1 represents one embodiment of the system described herein and that in other embodiments the functionality described herein may be implemented using more, fewer, or different components. In addition, the functionality of SRDBS described herein may be partitioned between various components in a manner different than that described herein and illustrated in FIG. 1.

In the embodiment illustrated in FIG. 1, the administrative tier, implemented on one or more administrative servers 110, is the administrative interface through which SRDBS users can administer their namespaces. In some embodiments, developers may create their namespaces and relational database tables using simple interfaces to administrative servers 110 (e.g., web based interfaces).

As noted above, each namespace may be partitioned across multiple databases. In the example illustrated in FIG. 1, the client-side routing tier, implemented as client library 140, may provide a mechanism to route client queries to the correct partition. In some embodiments, this tier may also be responsible for aggregating the results of a query that spans multiple partitions to provide a unified result set to the client application. Client library 140 may in some embodiments be implemented as an emulated JDBC driver that encapsulates the client library portion of SRDBS. As noted earlier, an important task of the client-side tier is to route client queries to the correct partitions. The client tier may in some embodiments resolve a partition to a server by consulting a partition map, transparently to the client application. This partition map may be implemented as a routing table that contains a list of partitions and the respective database servers 130 that host each of them. In the example illustrated in FIG. 1 and described herein, partition maps may be maintained by the administrative server 110 on the administrative tier and on gateways 150, and local copies may be cached at the client tier (e.g., in client libraries 140). In other embodiments, partition maps may be maintained in a separate bootstrap tier (not shown), as described below.

Note that in some embodiments, subscribers to the service may not be able to view their partition maps directly (e.g., via a web interface), while in other embodiments, subscribers may be able to view a partition map if they log into the service through a web services interface and are authenticated by the system as an authorized reader (or owner) of the partition map and/or the corresponding namespace. For example, in some embodiments, each namespace is associated with a separate subscriber account having a respective password, while in other embodiments, a single subscriber account may be associated with multiple namespaces, and a single password may be used for all namespaces associated with an account/subscriber. Such passwords may be used to authorize access to information about subscriber accounts and namespaces (e.g., partition maps and various metrics) and/or to authorize queries to access particular namespaces. In addition to subscriber passwords, SRDBS may include respective passwords usable by each gateway process 150 to obtain access to each of its namespaces, and which may be mapped to each client and/or subscriber. In such embodiments, the client and/or subscriber may not know these passwords, which may be generated by administrative server 110. In some embodiments, clients may have respective passwords for interacting with the gateways containing their namespaces (e.g., one password per namespace).

Also note that the client libraries 140 illustrated in FIG. 1 as being components of the overall SRDBS implementation may, in different embodiments, reside on (and be executed on) client application servers 120 or on administrative server 110. For example, in some embodiments, a subscriber to SRDBS may download program instructions configured to implement client library 140 from a computing node implementing an administrative server 110 (or elsewhere) to a computing node implementing client application server 120 for execution on client application server 120. In other embodiments, a subscriber may remotely execute program instructions configured to implement client library 140 that are physically resident on a separate computing node, such as by logging into an administrative tier or a middle tier in order to execute them.

To perform accurate and efficient routing of client queries, the client library may provide the following functionality:

Query validation: Query validation may involve parsing each of the client queries and determining the set of partitions to which the given query is addressed. As part of this operation, queries may also be validated to ensure that invalid queries (such as global joins, in systems that do not support them) are not accepted by the system. If a query is found to be invalid, an indication of an error may be returned to the requesting client application.

Query Routing: Upon determining the set of partitions required by the query, the partition map may be consulted to retrieve an indication of the appropriate endpoint(s) and routing information for accessing them.

Query Result Combining: In some embodiments the client library 140 provides a function to combine query results when a query spans multiple partitions (e.g., through concatenation, merging, aggregation, etc.).

Administrative tier interaction: The client library 140 may interact with the administrative tier (e.g., administrative servers 110) to receive the partition map for a target namespace.

While in the examples described herein, routing is performed by client libraries 140 on the client-side tier, in other embodiments this functionality may be implemented in a middle tier. For example, in embodiments in which client libraries 140 reside on administrative server 110, rather than on client application servers 120, routing may be performed at administrative server 110. In other embodiments, client-side routing may be performed on gateways 150. In still other embodiments, a client-side routing tier may be placed between client application servers 120 and other components of SRDBS (e.g., administrative server 110 and/or gateways 150).

The gateway tier, shown as gateways 150 in FIG. 1, may in some embodiments serve as the entry point for accessing the physical database servers 130. In some embodiments, gateways 150 may handle the process of user authorization, query execution, and resource isolation. Note that in some embodiments, each database server may include multiple namespaces, and each namespace may be accessed through a respective gateway 150. This tier may also work in coordination with the administrative tier and database tier during repartitioning, as described in more detail below. In some embodiments, the primary function of the gateway tier may be summarized as "to receive a client query and execute it according to the guaranteed resource constraints, while handling events such as network and server failures behind the scenes". To this end, clients may not communicate directly with the physical database servers 130. Instead, all queries may be routed through a gateway process 150, as illustrated in FIG. 1. In some embodiments, a single gateway process 150 may run on each database server 130, and may serve as the gateway to executing any query at its corresponding database server 130. The gateway 150 may be responsible for handling client requests and interacting with the administrative tier to handle events such as repartitioning and background maintenance tasks.

The functionalities of the gateway tier may include both client request management tasks and administrative tier management tasks. For example, client request management tasks provided by gateway 150 may include client connection pooling. For example, in one embodiment, for each CPU resource leased, the service may include a standard allocation of 100 connections to the namespace or to each partition of the namespace, which may be managed by gateway 150. Client request management tasks may also include performing final validation that the local database server 130 is the right destination for an incoming query. This validation may include checking the partition range against a current partition map, checking the read mode, and (for a query that performs a windowed read at a replica) checking that the time lag of the corresponding database is within the read window specified, in various embodiments. Client request management tasks provided by gateway 150 may also include rerouting and/or returning an incoming query to the requesting client application if the routing decision made by the client is based on an outdated partition map. In some embodiments gateway 150 may also notify the client of the outdated map, which may prompt (or force) the client to refresh the partition map (e.g., by providing the current partition map itself, or by prompting the client to request a current partition map from administrative server 110). In some embodiments, gateway 150 may be configured to provide a partition map update to client applications (e.g., to update their drivers) before an updated partition map is available from administrative server 110 and/or a bootstrap server.

Administrative tier management tasks provided by gateway 150 may include working with the administrative tier to perform the creation, modification, and/or deletion of namespace ranges in each database. For example, gateway 150 may in some embodiments execute the creation, modification, and/or deletion of objects in its corresponding local database. Gateway 150 may also execute background maintenance tasks such as backups and index rebuilding, in some embodiments.

The database tier, implemented on database servers 130, in this example, may handle the process of data replication, handle failures of database servers, handle network failures, and provide the necessary levels of durability guarantees. In some embodiments, this tier may perform repartitioning by moving the required set of data from one database server 130 to another. In general, the database tier comprises a database (e.g., implemented on one or more database servers 130) and its management services. The database tier may in some embodiments provide for high availability through the use of a primary (i.e., writable) database and readable replicas with automated failover between them during failures. Note that, in some embodiments, write availability may be impacted during failover, as well as during maintenance events (e.g., during upgrades and repartitioning). The database tier may in some embodiments provide durability through the use of synchronous writes between a primary database and at least one replica database, which may be located in a single data center (e.g., at a single site) or in multiple data centers. The database tier may support backup and recovery operations by providing the ability to perform hot backups of the entire database or of a particular namespace, in various embodiments. Final security validation may be provided through the use of the database's own security mechanisms. For example, in some embodiments, an SRDBS implementation may rely on built-in security mechanisms of commercially available database servers. Finally, the database tier may provide final control over resource allocations to the namespaces.

As noted earlier, the administrative tier may serve as the administrative interface to both clients (e.g., those executing on client application servers 120) and databases (e.g., those implemented on database servers 130). Therefore, the tasks of the administrative tier may be thought of as including two different types of tasks: client-side (i.e., customer facing) tasks and server-side tasks. For example, client-side administration interfaces may include functionality necessary to support namespace management (e.g., namespace creation, life-cycle management, deletion, and/or modification) and reporting of metrics. In some embodiments, all client-side functionality may be provided through a web services API. Server-side interfaces may include functionalities such as partition map management (e.g., at creation and/or as a result of repartitioning), capacity allocation, coordination and/or scheduling of backup and recovery services, and maintenance tasks. These tasks are described in more detail below and in the flow chart illustrated in FIG. 2.

As previously noted, an SRDBS implementation may in some embodiments include a separate bootstrap tier (not shown). In such embodiments, a bootstrap server (rather than administrative server 110) may be configured to cache the partition map for a given namespace, to update it when instructed to by one of the processes of the gateway tier (e.g., one of gateways 150), and to provide it to the client-side routing tier (e.g., one of client libraries 140) on request. The client-side routing tier (e.g., client libraries 140) may use the bootstrap tier for initial discovery of gateway services, by requesting a partition map from the bootstrap tier. Like the administrative tier, the bootstrap tier may be centralized and may never be partitioned. However, it may be configured to be highly available through redundancy, occasionally at the expense of some consistency. The routing tier may in some embodiments initially load the entire partition map from the bootstrap tier (e.g., when the client first accesses a namespace, or in response to losing the partition map due to a process restart or other system event). Under normal operation, the client tier may get updates from the gateway tier on an as-needed basis. For example, if a client tries to contact a gateway that used to service a particular hash value range but no longer does, that gateway may return one or more updated partition map entries to the client that completely cover the old range. However, in the event of failures, the old gateway may not be available to redirect clients to the new gateway. Therefore, in some embodiments, in the case of a failure, the new gateway may proactively update the bootstrap tier with the new entry or entries, guarding against out-of-order updates, which may allow clients to discover them as needed. In some embodiments, if a client does not access a particular partition for an extended period of time and/or if all gateway address mappings for a given hash value range have changed, the client may need to refresh the entire partition map from the bootstrap tier.

As noted above, namespace management may include the creation, modification, life cycle management, and deletion of namespaces on behalf of users, and the management of those namespaces, including the management of user accounts, privileges, and resource requirements associated with those namespaces. For example, the administrative tier may manage the configuration of subscriber accounts and their associated namespace(s), providing functionality for adding or deleting users for an account, configuring read/write access rights for particular users and/or namespaces, and/or for storing and managing passwords for each subscriber and/or namespace. In the example illustrated in FIG. 2, an SRDBS user (e.g., a subscriber to the service) may request the creation of a namespace through a web services API. As illustrated in block 210 of FIG. 2, a request for services may be provided to the administrative server 110 on behalf of a subscriber that includes any or all of a namespace identifier, a partition key, a requested service level (e.g., a request for a given allocation of disk space, CPU resources, and/or I/O resources), and a database schema for the namespace. For example, a service request may specify that the subscriber wishes to lease the equivalent of one CPU and 100 Gbytes of storage space for a given namespace. In different embodiments, a request for services may be performed by exchanging one or a series of messages between a subscriber and the service. For example, in one embodiment, one or more messages may be exchanged between a potential subscriber and the service in order to establish the potential subscriber as a subscriber to the service and/or to set up his or her account. In some embodiments, a request for services that includes a request for creation of a namespace may involve the exchange of one or more messages between a subscriber and the service that collectively include the information needed to create the namespace (e.g., a namespace identifier, partition key, and data). For example, a first message from the subscriber to the service may include an indication that the subscriber wishes to create a new namespace, and may include any or all of a namespace identifier, service level parameters, a database schema, and a partition key. Once the service has acknowledged the request and/or initialized the namespace, and has indicated as much by sending a message to the subscriber, a second message from the subscriber to the service may include the data to be stored in the namespace.

In response to a request to create a new namespace, the administrative server 110 may create the requested namespace (including, e.g., tables, indexes, etc.), allocating resources and managing resource allocation settings according to the parameters included in the request, as in 220. In another example, a service request may include the definition of tables and their fields for the namespace in a database schema and the administrative server 110 may create the tables according to the definition.

Figure 2:
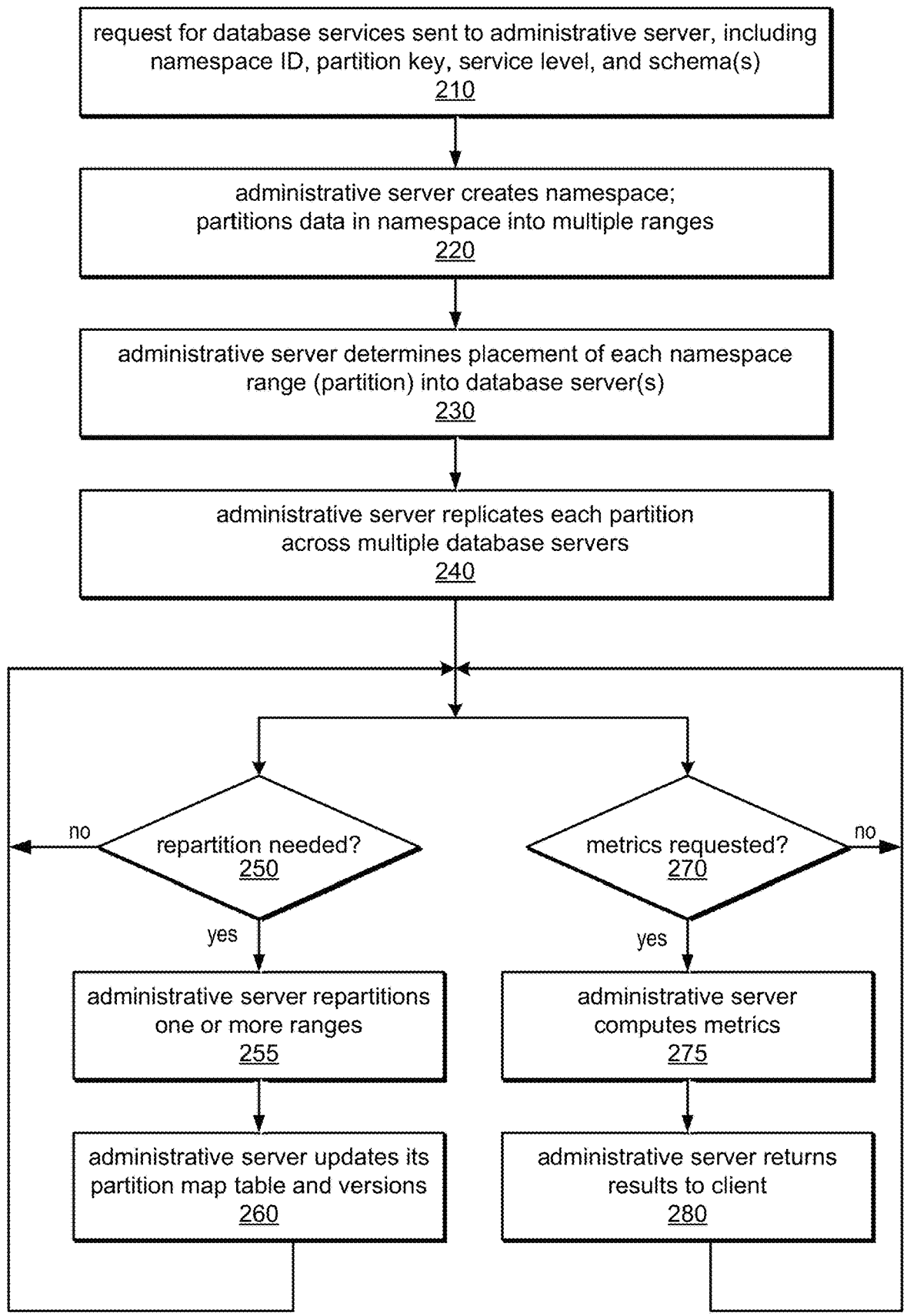
FIG. 2 illustrates one embodiment of a method for providing administrative services in SRDBS.

Note that in some embodiments SRDBS may guarantee that the subscriber can utilize the specified allocation of resources, rather than guaranteeing a particular latency or throughput (which may be highly dependent on the complexity of a given query and/or the size and complexity of the target database). Note also that in some embodiments, a subscriber may request a particular type or style of available hardware for their namespace, and the use of this hardware may also be guaranteed by the service. In some embodiments, the administrative server 110 may also manage backup and recovery of the namespaces, e.g., at the request of a subscriber. In various embodiments, the subscriber's data (i.e., the collection of data to be managed using the namespace) may be included in the initial service request, while in other embodiments, the data may be provided to the service in a separate loading operation once the namespace has been created and the associated resources have been allocated and/or configured for its use (not shown). As illustrated in FIG. 2, the administrative server 110 may partition the data in the namespace into multiple ranges (e.g., into multiple databases), according to the specified partition key.

The server-side administration functions provided by administrative server 110 may include determining the placement of each namespace range into the appropriate database server(s) (e.g., one or more database servers 130), as shown in 230. As previously noted, this may include replicating each partition across multiple database servers 130, as shown in 240. Once a namespace has been created, the administrative server 110 may provide other administrative functions as needed. For example, if one or more namespaces or partitions thereof need to be repartitioned, for any of various reasons, the administrative server may facilitate the repartitioning of one or more ranges. This is illustrated as the positive exit from decision block 250 and block 255. If the administrative server 110 repartitions any of the ranges of a namespace, it may also provide functionality to update its partition map table and version information appropriately, as in 260. The use of version information associated with partition maps is described in more detail below.

As illustrated in FIG. 2, the administrative server 110 may also provide metric reporting functionality, in some embodiments. For example, a client application may request metrics associated with one of its namespaces or a subscriber may request such metrics directly through a web services API. This is illustrated as the positive exit from decision block 270. If metrics are requested, the administrative server 110 may gather, concatenate, and/or compute the requested metrics, as shown in 275. The administrative server 110 may then return the results to the client, as in 280. In various embodiments, the administrative server 110 may provide metrics and monitoring of the overall health of the SRDBS implementation (e.g., overall metrics of the service) and/or metrics associated with particular namespaces, users, etc. For example, in some embodiments, the metrics that are available through the administrative server may include elapsed time, CPU usage, I/O usage, the number of committed writes, etc. In some embodiments, the metrics may include a ranking of query frequency (e.g., the top 10 queries performed for a given namespace, partition, or subscriber). These metrics may be available at multiple levels including, in various embodiments, per statement, per client application, per access account (e.g., per user or subscriber), per client host (e.g., per client application server 120), per namespace, per partition, or per partition copy within a replica group. In some embodiments, statistics such as size, access counts and/or frequency, and cardinality may be available for all objects. In some embodiments details regarding a query plan, such as how the query will access tables (e.g., what keys and/or search criteria will be used and in what order), may be provided, similar to details provided by commercially available database implementations. This may include details about any aggregation work performed at the client.

In addition to providing functionality to manage repartitioning, monitoring, and metrics reporting, the administrative server 110 may in some embodiments also provide maintenance management for the SRDBS implementation, including, but not limited to, scheduling maintenance (including backups and index maintenance) and managing security configurations. In some embodiments, such maintenance activities may be performed by the administrative server 110 on a schedule determined by the administrative server 110, while in others, the frequency and/or schedule for such activities may be specified as part of the subscriber's service agreement.

Note that if a subscriber to SRDBS wishes to define another data partition, the subscriber may define another namespace with a different partition key. In some embodiments, each namespace defined by a subscriber may be managed using the same service level agreement (SLA), while in other embodiments different SLAs may be applied to respective namespaces associated with the same subscriber, according to the subscriber's requests.

Figure 3:
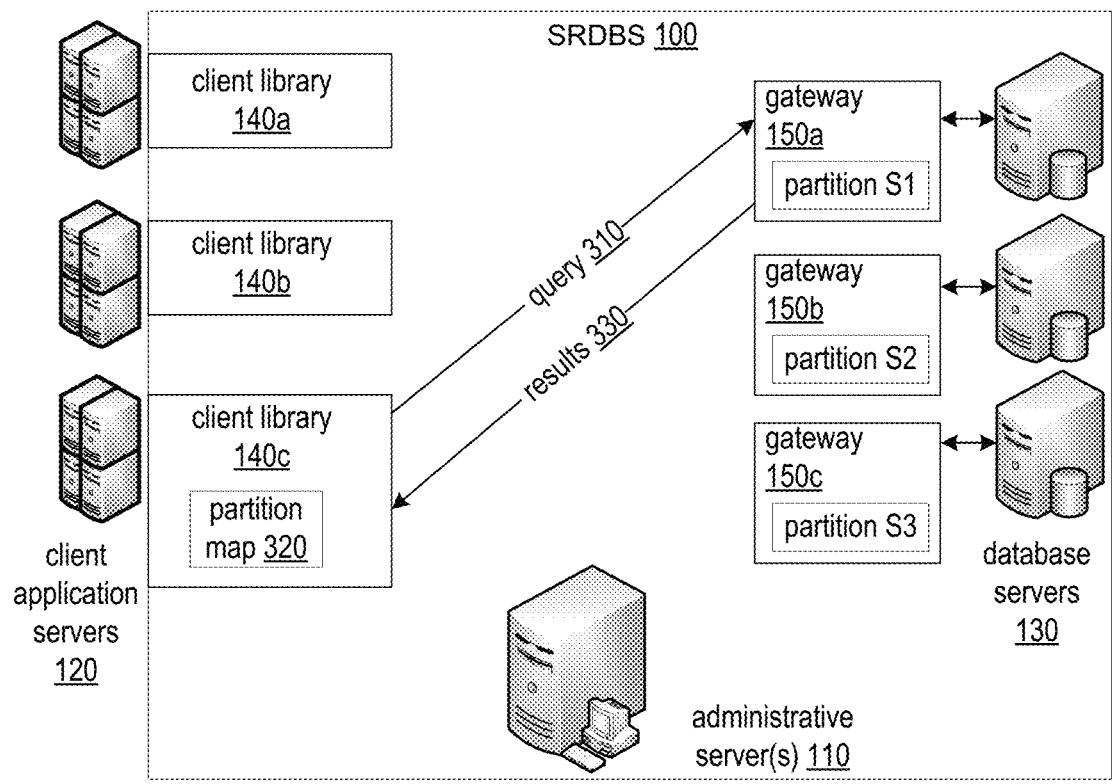
FIG. 3 is a diagram illustrating execution of a query in SRDBS, according to one embodiment.

The system and methods for providing a scalable relational database service may be described in more detail with reference to FIGS. 3 and 4. FIG. 3 illustrates an SRDBS implementation 100, in which a query 310 is directed to a particular database server 130 on behalf of a client application, and results 330 are returned to the requesting client application.

Figure 4:
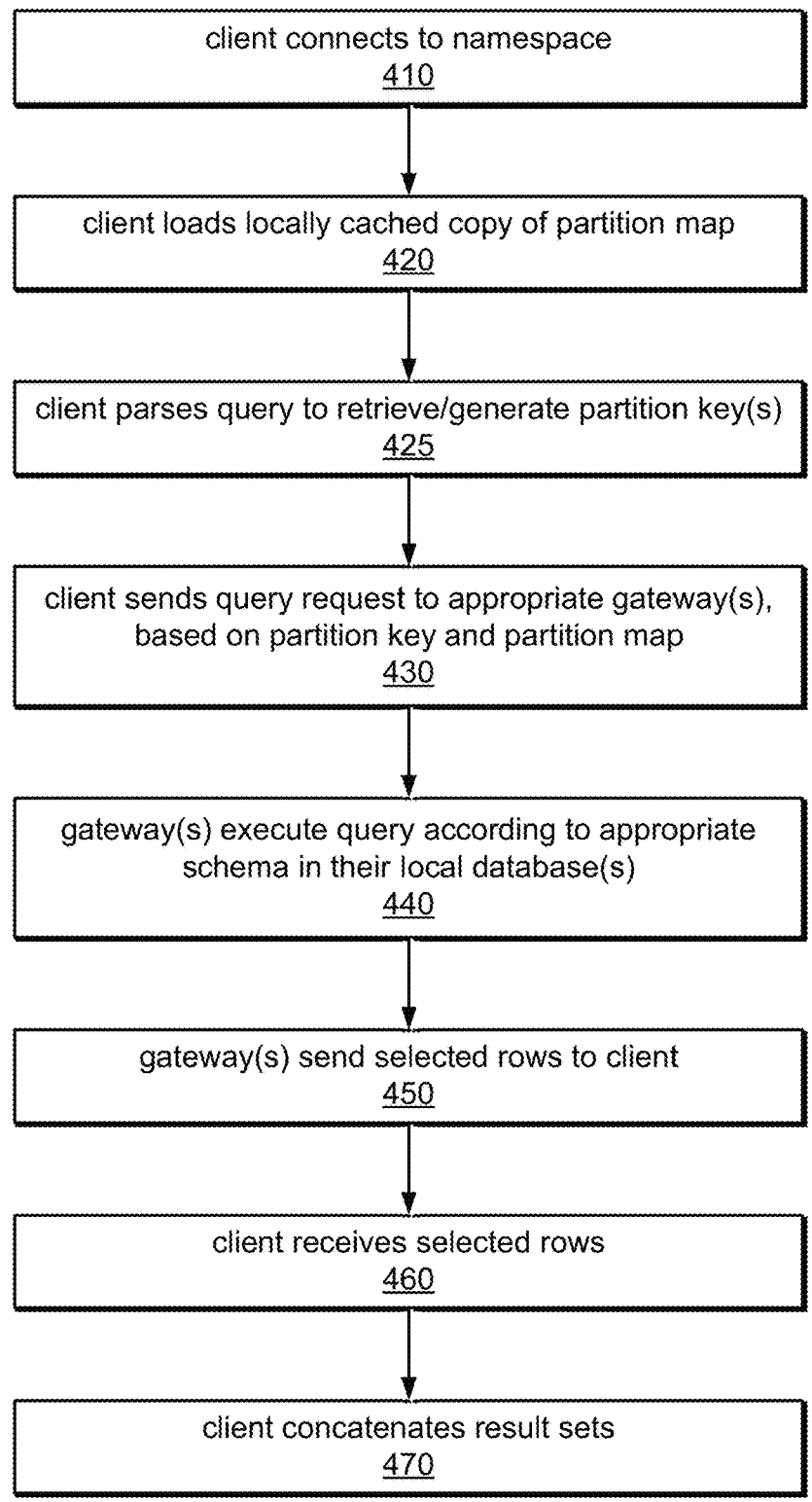
FIG. 4 is a flow chart illustrating one embodiment of a method for executing a client query.

The flow chart of FIG. 4 describes the operations that may be performed by the various components of SRDBS 100 in executing client query 310. In this example, query 310 may be a SELECT query, i.e., one that requests data meeting specified criteria. As illustrated in FIG. 4, the method for performing such a query includes the client application connecting to the namespace, as in 410. Once the client is connected to the namespace, it may load a locally cached copy of the partition map for the namespace. A locally cached copy of a partition map 320 is illustrated as part of client library 140c, in FIG. 3. The client library 140c may parse client query 310 to retrieve the partition key(s) and/or may generate partition key values from information included in the query, as in 425. Note that in some embodiments, a query validator may be included in SRDBS (e.g., it may be built on top of a Java SQL parser). In such embodiments, the query validator may retrieve the partition key(s) addressed by each query. Upon retrieval of partition keys, the client library may consult the partition map to determine the set of databases that hold the partitions addressed by the query.

In the example illustrated in FIG. 4, the client may send a query request to the appropriate gateway, based on the partition key and cached partition map, as shown in 430. For example, the client may execute the following query:

```
select order_id, customer_id, order_date, availability
    from orders o, order_items oi
        where o.order_id = 1002 and o.customer_id = 10
        and o. order_id = oi.order_id
        and o.customer_id = oi.customer_id
```

This query may be used to select all data corresponding to orders and order items for which the customer identifier is 10 and the order identifier is 1002. In this example, the partition key for the target namespace is the customer identifier (customer_id). Therefore, the client library 140c may retrieve the partition key value from the query request (in this case, a customer_id value of 10), and may execute a hash function (e.g., a MD5 hash) to generate the appropriate partition identifier. Subsequently, the client library 140c may check the local partition map (e.g., partition map 320) and may send the query 310 to the gateway in charge of the partition corresponding to the generated partition identifier (in this case, gateway 150a, which holds partition S1). Note that if the query includes a write or modify request, it may be routed to the primary copy of the appropriate partition, while a read-only query may be routed to one of the other copies in the replica group that includes the partition. For example, a load to balancing function included in client library 140c and/or gateway 150a may be used to help determine to which copy of a partition a given query should be directed in order to balance resource loading, throughput, etc. Note that in some embodiments, replication may be implemented across multiple data centers (sites), as described herein. Note also that in this example, the query will join tables for order data and order item data, where the data is associated with the same order identifier and customer identifier. Since they share a partition key value (customer_id=10), the query will be directed to a single partition to retrieve the data.

Upon receipt of the query 310, gateway 150a may perform the appropriate authorization and then execute the query in its local database (e.g., in partition S1 of the subject namespace on its associated database server 130), as in 440. In this example, the result set for the query 310 may include those rows in the namespace for which the customer_id value is 10 and the order_id value is 1002. The gateway 150a may then send the result set (e.g., the rows selected in response to the query) to the client application, as in 450. The client application receives the selected rows through the client library 140c, as in 470.

Note that if the query 310 spans multiple partitions, then the client library 140c may route the query 310 to multiple gateways 150, and may retrieve a partial result set from each of these gateways 150. In such cases, client library 140c may concatenate these partial result sets to generate a unified result set, as in 470, before returning the results to the requesting client application.

Figure 5:
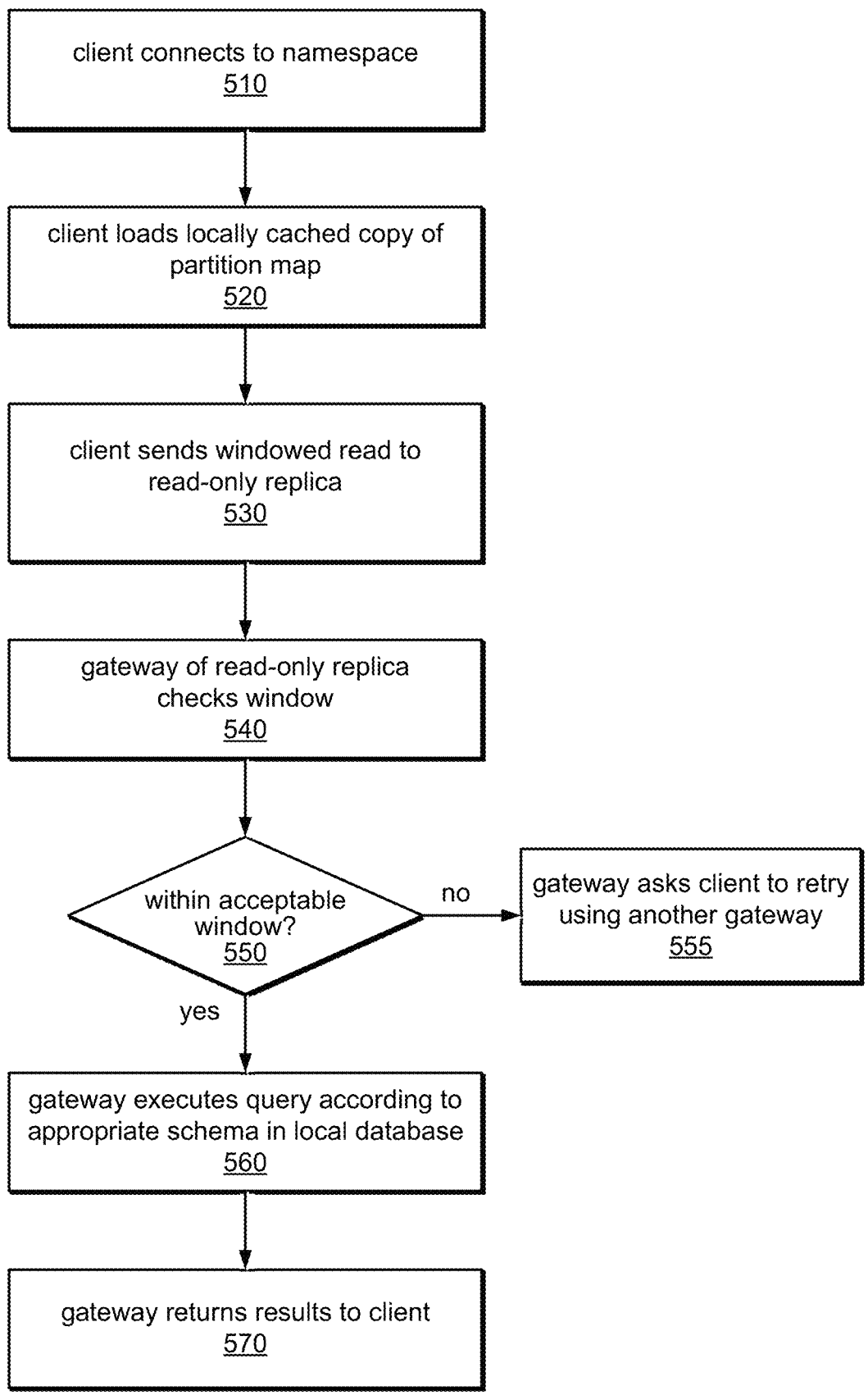
FIG. 5 is a flow chart illustrating one embodiment of a method for executing a windowed read.

As noted above, an SRDBS implementation may in some embodiments include functionality to support windowed reads. FIG. 5 illustrates one method of performing a windowed read, according to one such embodiment. In this example, a query may begin as in the previous example, with the client connecting to the target namespace. This is illustrated at 510. As in the previous example, the client may load a locally cached copy of the partition map for the target namespace to determine the partition identifier, as in 520. In this example, a client has issued a windowed read (i.e., one that specifies an acceptable window for timeliness of the data in the database). The client query may be routed to one of the read-only replicas associated with the namespace partition, according to the determined partition identifier. As shown at 540, the gateway of the read-only replica may then check to see if the time lag of its database is within the acceptable window specified by the windowed read, as in decision block 550. For example, in some embodiments, the gateway may examine a sequence or change log, log sequence number (LSN), sequence change number (SCN), or other information available from the underlying database engine to determine if the time lag of the database meets the requirements of the specified time window. If so, the gateway may then execute the query, as in 560. Otherwise, the gateway may in some embodiments ask the client to retry the query using another gateway, as in 555. Note that in some embodiments, windowed reads are performed in a read-only mode. For example, in one embodiment, read-only mode may be set in a JDBC driver that encapsulates the client library before performing windowed reads. The client library may also support functionality to set the specified consistency window, according to a request from a client application.

An example of the partitioning of objects in a namespace for an ordering application that uses a partition key of customerID is illustrated below and in FIGS. 6A and 6B. In this example, the objects in a given namespace are partitioned as follows:

```
ORDERS (PK - orderID)
ORDER_ITEMS (PK - order_itemID, FK orderID)
ORDER_ITEM_DETAILS (PK - order_item_detailID,
    FK - orderID & order_itemID)
SHIPMENTS (PK - shipmentID)
```

In other words, ORDERS are partitioned using a primary key (PK) of orderID; ORDER_ITEMS are partitioned using order_itemID as a primary key and ORDER_ID as a foreign key (FK); ORDER_ITEM_DETAILS are partitioned using order_item_detailID as a primary key and both orderID and order_itemID as foreign keys; and SHIPMENTS are partitioned using a primary key of shipmentID.

Note that, as shown in this example, the primary key and the partition key do not need to match, as long as the partition key is the root of the relationship hierarchy. The relationship hierarchy between the partition key and all of the namespace's primary keys, in this example, is illustrated in FIG. 6A. As shown in FIG. 6A, the partition key, customerID 610, is the root of the relationship hierarchy, and the primary keys are further down in the hierarchy. In this example, shipmentID 620 and orderID 630 are one level below the root, order_itemID 640 is two levels below the root, and order_item_detailID is three levels below the root.

Note that, in various embodiments, a variety of methods may be employed to ensure that stored objects are associated with the relevant partition identifier. For example, in some embodiments a relationship hierarchy (such as that illustrated in FIG. 6A) may be traversed to determine the appropriate partition identifier. In other embodiments, the relevant partition identifier may be associated with (and/or stored with) every object. In general, any suitable method may be used to associate a given partition identifier with all objects to which it corresponds. Conceptually, the partition map may be thought of as a lookup table that maps partition identifier range pairs, for example (namespace, hash(partition-key)), to partition location pairs, such as (gateway-ip-addr, gateway-port-num). In some embodiments, ranges of hash values may be used universally in the implementation for compactness. Note that, for recovery from failover events, the mapping may include an ordered list of partition/gateway mappings, with the first entry indicating the gateway of the current primary (e.g., writable) copy. In some embodiments, a timestamp may be used in maintaining the entire list. If a client is unable to reach the current primary copy of a partition, the client may contact the bootstrap tier in the hopes of discovering the new primary copy, in some embodiments. In other embodiments, the client may simply start trying the other gateways in the list to see if one of them has identified itself as mapping to the new primary copy.

Figure 6A:
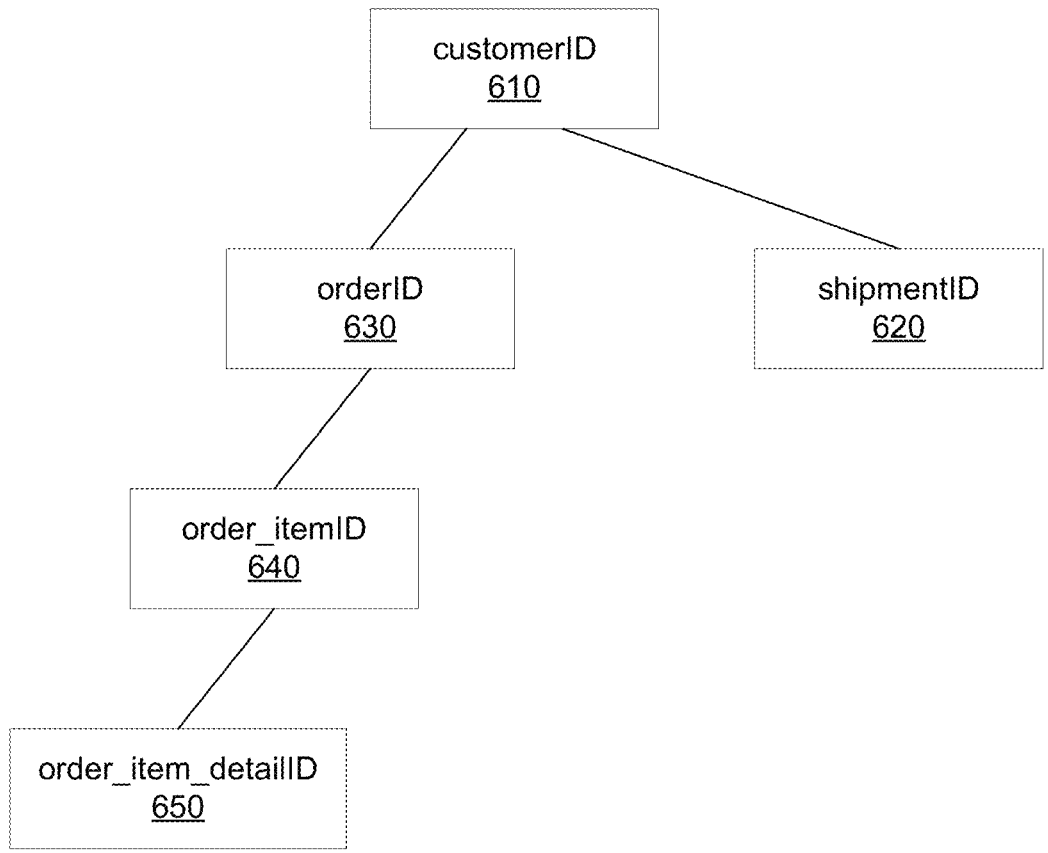
FIG. 6A illustrates a partitioning hierarchy, according to one embodiment.
Figure 6B:
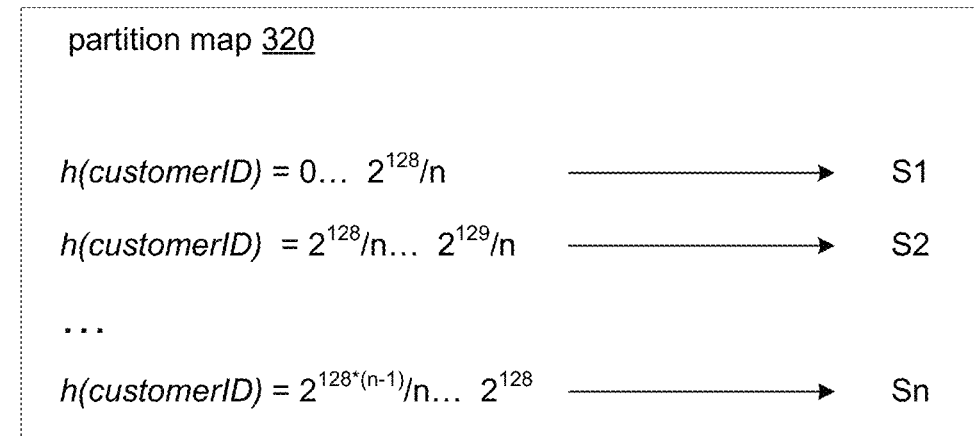
FIG. 6B illustrates a partition map, according to one embodiment.

An example of a partition map 320 for the namespace of the previous example is illustrated in FIG. 6B. In this example, partition map 320 may represent the partition map cached in client library 140c, illustrated in FIG. 3. As shown in FIG. 6B, partition identifiers may be generated dependent on the partition key (i.e., customerID) and mapped to various partitions S1-Sn. In this example, the partition key value ranges for each partition are the same size. However, in other embodiments, the partitions may be mapped to differently sized partition key value ranges (e.g., depending on the amount of data corresponding to each range and/or the expected write load for each range). Using this example, the following query may be received by a client library:

update orders set orderDate='11-MAY-05' where orderID=54352 and customerID=2345

According to the example hierarchy illustrated in FIG. 6A and the partition map illustrated in FIG. 6B, the client library may generate a partition identifier by computing a hash of the customerID value included in the request:

PartitionID=h(2345)

In this example, if the number of partitions, n, is 10, the hash of the customerID value (which is between 0 and $2^{128}/10$) would map to partition S1. Therefore, using the example SRDBS implementation illustrated in FIG. 3, this query may be handled by gateway 150a, which holds partition S1.

An SRDBS implementation may provide various means to allow the clients to learn about the latest system state of the database servers of the system. For example, client libraries 140 may need to receive updates regarding which database servers are up and/or down and which databases hold which partitions. Maintaining this information may be difficult in embodiments in which this information changes often, such as with changes in replica group configurations, server configurations, and/or network configurations. However, building a complete broadcast model in which all system changes are propagated to all clients may not result in a highly scalable implementation. Therefore, in some embodiments, rather than employing such a "push" model, SRDBS may employ a "pull" or "lazy caching" model, in which clients store a locally cached copy of a partition map and route queries using this map. Such embodiments may include a variety of recovery mechanisms for updating stale data, some of which are described herein.

As noted earlier, SRDBS implementations may include a gateway process that manages each database. The gateway may manage connections made to the underlying database partition. Each gateway may be provided with a partition map by the administrative server, and this partition map may specify the layout of partitions within a database ring. For example, a database ring may include a ring of databases partitioned between multiple database servers (similar to a pool of database servers), and each namespace may be stored within a single database ring. Multiple such rings may be distributed across two or more data centers (e.g., at different sites), and each ring may store two or more namespaces. In some such embodiments, the gateway may use the partition map to verify that the issued query is valid to be executed on the local partition. Note that in different embodiments, each gateway may maintain partition maps for all of the databases maintained by the service (or maintained in a given database ring), or may only maintain partition maps for the namespaces stored in the one or more database(s) managed by the gateway. To identify the current system state, the partition maps may be versioned. In some embodiments, version numbers used in a partition map may be monotonically increasing sequence numbers that may be updated when there is a change in the replica group configuration for the partitions of a namespace. In other embodiments, version identifiers may include timestamps or other numerical or non-numerical version identifiers. A version change in partition map may happen when: (i) there is a failure of a primary or read-only copy in a replica group or (ii) when a namespace's data is repartitioned.

Figure 7:
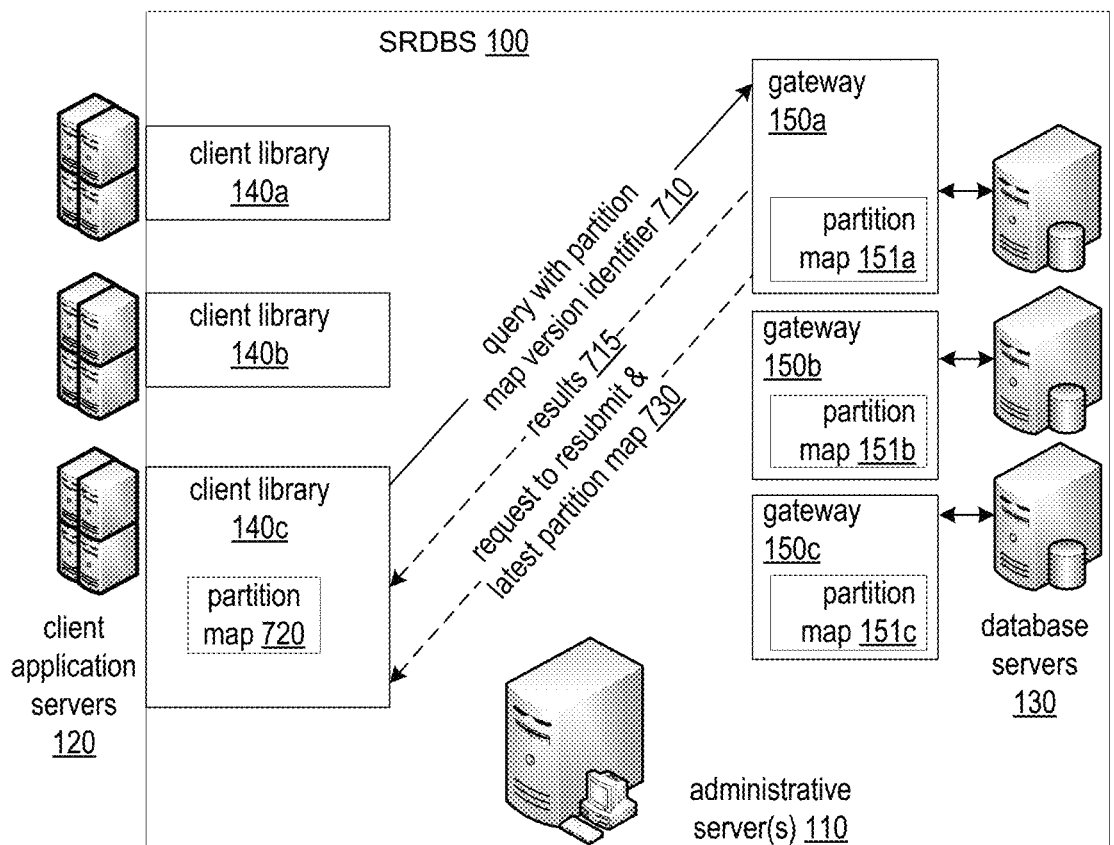
FIG. 7 is a diagram illustrating execution of a query that includes a partition map version identifier, according to one embodiment.
Figure 8:
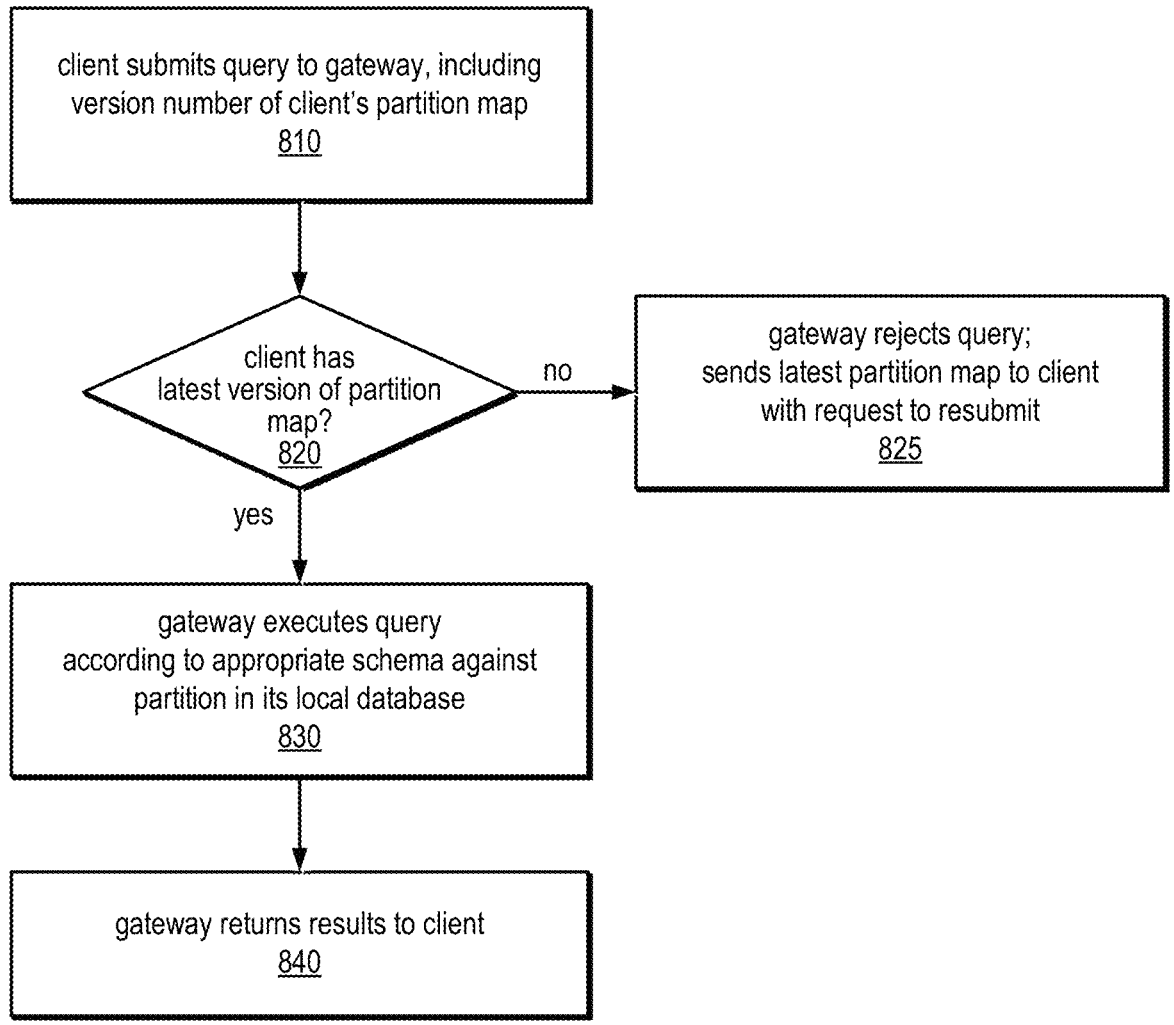
FIG. 8 is a flow chart illustrating one embodiment of a method for executing a query using a partition map version number.

The use of version identifiers in partition management is illustrated by way of example in FIGS. 7 and 8. FIG. 7 illustrates an SRDBS implementation in which version identifiers are associated with partition maps. In this example, each partition map cached in a client library 140 (e.g., partition map 720 in client library 140c) and each partition map 151 maintained by a gateway 150 on behalf of its associated database server 130 may include such a version identifier. FIG. 8 illustrates one method of using such version identifiers in managing partitions. In this example, a client may submit a query to a gateway, based on its locally cached copy of the partition map for the target namespace. This is illustrated as block 810. The query may include the version number of the locally cached copy of the partition map. This is also illustrated in FIG. 7, in which a client library 140 sends a query 710 to a gateway 150 based on its cached partition map (e.g., partition map 720), and the version identifier of the cached partition map is included in query 710.

As shown in FIG. 8, at decision block 820, the gateway may check to see if the client library is using the latest version of the mapping for the target partition. As illustrated in FIG. 8, in some embodiments, the gateway may determine if the client library is using an up-to-date partition map by comparing a version number sent with the query to the version number of its own copy of the partition map. If the mapping used for routing the query is current (shown as the positive exit from 820), the gateway may accept the query, execute it against the partition in its local database (as in 830), and return results to the client (as in 840). This is also illustrated in FIG. 7 as the return of results 715 from the gateway 150a to client library 140c. If the client library is not using the latest version of the partition map, the gateway may reject the query, and may also send the latest version of the partition map to the client library so that the client library may resubmit the query, as in 825. This is also illustrated in FIG. 7 as element 730 ("request to resubmit & latest partition map"). In some embodiments, the gateway may explicitly instruct the client to retry the query using the latest partition map, while in other embodiments, the client may determine whether and/or when to resubmit a failed query after receiving an indication of its rejection and/or a newer partition map. Note that in some embodiments, client library 140 may provide a timestamp of the latest update to their locally cached partition map along with a query, and gateway 150 may be configured to determine if the timestamp indicates that the locally cached partition map is out of date (e.g., with the timestamp serving as a proxy for a version identifier). While the method illustrated in FIG. 8 may work equally well to handle repartitioning due to both failures and other data repartitioning situations, the frequency of these two types of events may be dramatically different. Therefore, in some embodiments, an SRDBS implementation may handle these two cases differently, as described below.

Note that while the example illustrated in FIGS. 7 and 8 uses a version identifier to determine a current partition mapping, in other embodiments, a value used to determine the routing of the query (e.g., a hash value mapped to a partition identifier or other relevant data) or an indication of an expected partition range itself may be included in a query 710 instead of a version identifier. In various embodiments, the gateway 150 receiving the query may check its partition map records to determine whether it is the appropriate gateway 150 to accept the query and/or to perform the operations expected by the client library 140, according to the current mapping between its locally stored data and corresponding database partitions. If not, the gateway 150 may reject the query, and may also return one or more records indicating the correct gateway 150 for the current partition storing the targeted data. Note that for a query spanning multiple partitions, client library 140 may send the query to a single gateway 150 along with the range of hash values it expects that gateway 150 to handle. If that gateway 150 cannot handle the entire range, and/or if one or more of the partition mappings has changed since the client last received any updates, client library 140 may receive both a partial result and one or more updated partition map entries indicating that this gateway 150 now only handles part of that range, and/or indicating the correct mapping for all or part of the partition range. In other embodiments, for a query spanning multiple partitions, client 140 may send the query to two or more gateways 150 along with the range of hash values it expects each gateway 150 to handle. If one or more of the partition mappings has changed since the client last received any updates, client 140 may receive partial results from one or more gateways 150 and/or one or more updated partition map entries indicating the correct mappings for the remainder of the partition range. In some embodiments, the client library 140 may respond to a rejected query by contacting other known replicas of the target partition. In other embodiments, the client library 140 may query an administrative server 110 or a bootstrap server in an attempt to obtain a more up-to-date partition map and/or one or more updated entries thereof.

While global repartitioning of namespaces may be infrequent, the assignment of primary and read-only databases within a node may occur more frequently. If these changes are made visible across the entire database ring, then the burden on the administrative server may be unreasonably large. In some embodiments, in order to alleviate the load on the administrative server, a change to partitioning may be classified as either a major change or a minor change. In such embodiments, a minor change may be defined as any change that only affects a single partition. Any other change may be considered to be a major change.

Figure 9:
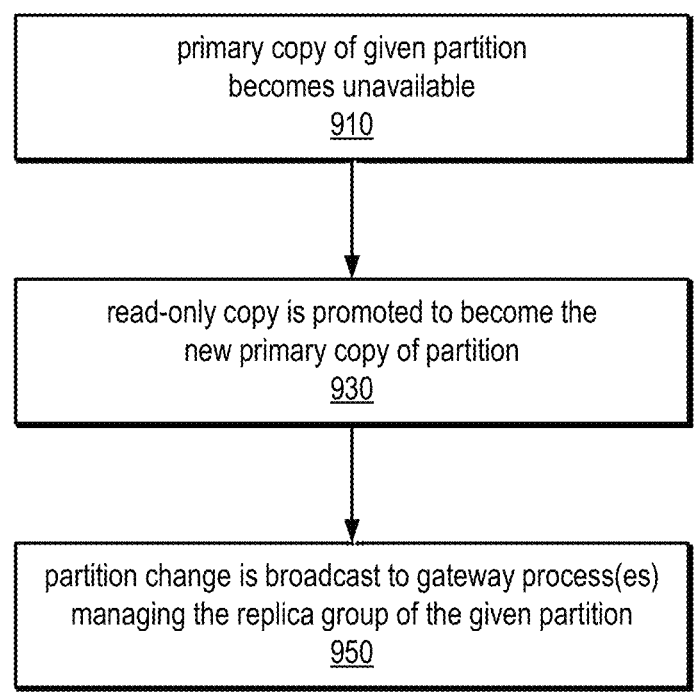
FIG. 9 is a flow chart illustrating one embodiment of a method for managing a minor version change to a partition map.

One example of a minor change, and the response of an SRDBS implementation to that change, is illustrated in FIG. 9. In this example, a primary (i.e., writable) copy of a given partition becomes unavailable, (e.g., if one or more servers in a replica group fails, or if a network failure causes a partition to be unreachable) as shown in 910. In some embodiments, the SRDBS implementation may handle this change by promoting a read-only copy of the partition to become the new primary copy, as in 930. For example, in some embodiments, the partition map may be updated so that the next gateway in the ordered list is marked as corresponding to the primary copy, but the rest of the list may remain the same. In various embodiments, clients may find the new primary copy by contacting each of the gateways on the list in order, or by contacting the bootstrap tier. In the example illustrated in FIG. 9, since the change is local to the gateway process or processes managing the affected database replica group, the change may only be broadcast to these specific gateway processes, as in 950. These gateways may exchange an updated partition map in its entirety, or may only exchange the one or more updated entries in the partition map. In some embodiments, the administrative server (and/or bootstrap server) may not need to participate in verifying the correctness of any changes, but may be informed of the changes by one of the affected gateway processes so that it can maintain a current and correct master copy of the partition map after the changes. Note that if the set of secondary (e.g., read-only) copies and/or their mappings change, the new primary gateway may be configured to determine the new list and the ordering thereof. In various embodiments, the new primary gateway may update its own partition map records accordingly, inform the secondary gateways of the changes, update a timestamp associated with the ordered list, and/or inform the administrative and/or bootstrap tier of the changes.

Figure 10:
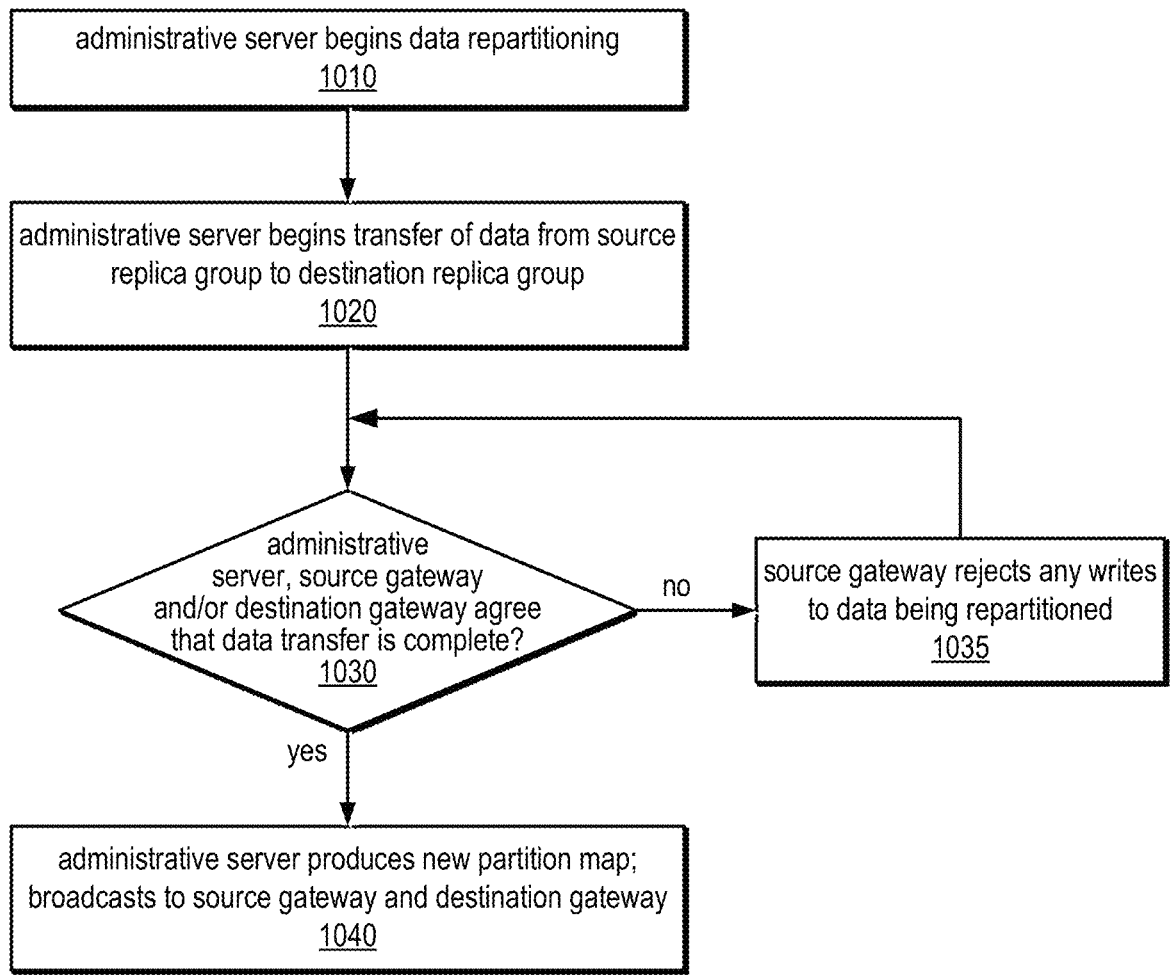
FIG. 10 is a flow chart illustrating one embodiment of a method for managing a major version change to a partition map.

One example of a major version change is illustrated in FIG. 10. In this example, an administrative server begins data repartitioning, for any of a number of reasons, including for performance improvements and scaling. This is illustrated as 1010. For example, in various embodiments, SRDBS may include functionality to monitor current resource usage and/or resource usage trends, and a database may be repartitioned if it becomes larger than a specified maximum size, if a given partition is over-represented in write accesses and would enjoy a performance benefit if split, or if a subscriber changes an associated Service Level Agreement (e.g., requesting more or differently allocated disk space, CPU resources, or I/O resources). In such cases, a partition may be split and redistributed among existing hardware resources, or additional hardware resources may be added to accommodate new partitions and/or partitions of modified (e.g., increased) size. Note that in various embodiments, the partitions of a given namespace may not be equally distributed by partition key values. For example, if one range of partition key values is heavily loaded with write accesses, that partition may be further divided into partitions having smaller partition key value ranges without changing the ranges of the other partitions of the namespace. In one example, if a heavily loaded partition is mapped to partition key values from 0-1000, and a second partition (less heavily loaded) is mapped to partition key values from 1001-2000, the first partition may be split by changing the partition map so that the first partition is mapped to values of 1-500 and a new (third) partition is mapped to values of 501-1000, while the second partition remains unchanged. Note that in some embodiments, two or more partitions may be merged into a single partition as part of a re-partitioning operation. During repartitioning, data may be transferred from one replica group (which may be referred to as a source replica group) to another (which may be referred to as a destination replica group). This is illustrated as 1020.

Irrespective of the precise data transfer mechanisms, upon completion of such a data transfer, it may be necessary for the administrative server, the source gateway (i.e., the gateway associated with the source replica group), and/or the destination gateway (i.e., the gateway associated with the destination replica group) to agree that the repartitioning is complete. This is illustrated as decision block 1030. For example, a consistency check or consensus protocol may be run, or another method may be used to reach consensus between the administrative server, the source gateway, and the destination gateway that the repartitioning is complete and that the changes were made correctly. In another example, once an administrative server or bootstrap server has provided initial partition maps to each of the gateways in the system, the gateways themselves may be configured to manage any partitioning updates (e.g., repartitioning, moving, or promoting partitions due to failovers or for other reasons). In such embodiments, only the source and destination gateways may need to agree that the changes have been made correctly. In such embodiments, these gateways may exchange relevant entries to update their partition map records without the involvement of an administrative server or bootstrap server. In such embodiments, the destination gateway and/or the source gateway may send one or more updated records to the administrative server and/or bootstrap server once they agree that the changes have been made correctly.

Once the relevant components agree that the repartitioning is complete, shown as the positive exit from decision block 1030, the administrative server may produce a new partition map (including an indication of primary and secondary copies of each affected partition and their associated gateways) and may broadcast it to the source and destination gateways, as in 1040. Note that in this example, no other gateways may need to be involved in this process, nor would any other gateways receive the new partition map. In another embodiment, the source and/or destination gateway may produce the new partition map and may publish it to the administrative server and/or bootstrap server. Note that after repartitioning is complete, the administrative server may be configured to purge data from the databases involved in the repartitioning. For example, in the case of range splitting, the administrative server may track and delete the data from each table in the namespace whose range no longer belongs in a given database. Similarly, in the case of namespace splitting, the administrative server may track and delete the namespaces and the corresponding objects that no longer belong in each of the databases. During the transfer of the repartitioned data (i.e., until the administrative server, source gateway, and/or destination gateway agree that the repartitioning is complete), the source gateway may reject writes to the repartitioned data. This is illustrated as the negative exit from decision block 1030 and block 1035. In some embodiments, the client library (e.g., encapsulated as a JDBC driver) may resubmit a query using the new partition map in response to an indication from the affected gateway that its locally cached partition map is now out-of-date (as shown in 730 of FIG. 7 and 825 of FIG. 8). This resubmission may in some embodiments be performed transparently to the client application.

Note that in some embodiments, changes to partition maps may not be implemented using a traditional synchronous commit process, in which the system must wait for acknowledgement that all affected components have applied a change. Instead, SRDBS may push the changes to each affected gateway, to an administrative server, and/or to a bootstrap server synchronously, but they may not be required to apply them synchronously, allowing them to delay application of the changes. In other words, an acknowledgement may be sent to the requesting client application that a partition map has been changed. This may indicate that the change has been sent to the affected gateways, administrative server, and/or bootstrap server and that the partition map is correct on the replica that initiated the change. However, at this point, the changes may not be visible to the client application and may not be correct on the other replicas or administrative/bootstrap servers until after they have been applied. Therefore, when a windowed read query is received, the primary gateway may be checked first, to see if any changes that happened outside of a consistency window have not yet been applied. If so, the query may be returned with an error or may be returned to be re-tried on another copy, in various embodiments.

Figure 11:
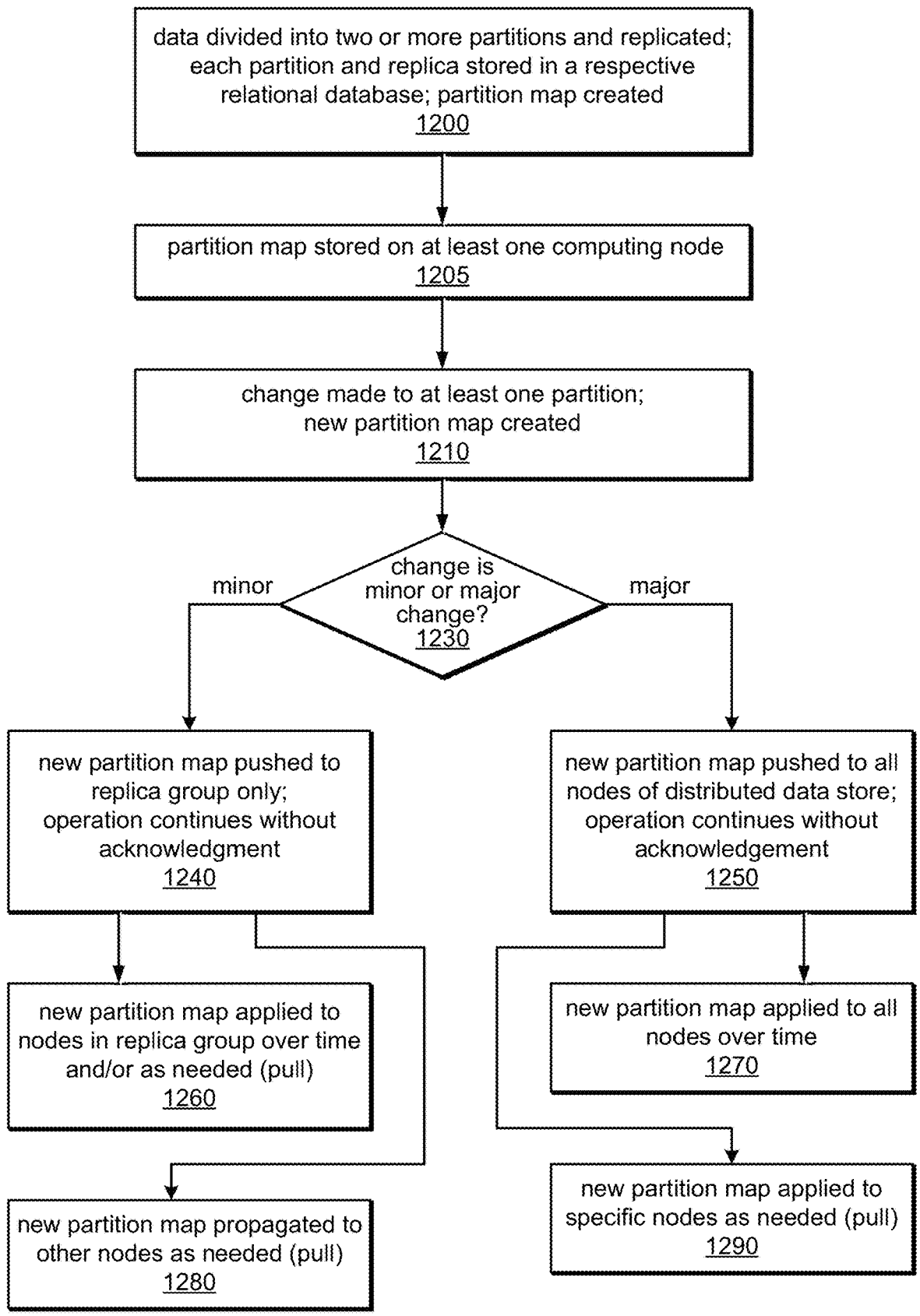
FIG. 11 is a flow chart illustrating one embodiment of a method for managing minor and major changes to partition maps.

Note that while the versioning mechanisms described herein are illustrated in terms of their application to SRDBS, they may be more generally applicable to relational databases and other applications in which not all participants need immediate notification of all changes in a system, such as various distributed file systems, or computing environments sharing resources other than storage devices. FIG. 11 illustrates one embodiment of a method for managing major and minor partitioning changes in a distributed data store. In this example, data to be stored in a distributed data store (e.g., SRDBS, or another system providing a database) may be divided into two or more partitions, as in 1200. For example, data associated with a particular namespace may be divided into multiple partitions according to a partition key, as described herein. Each partition may also be replicated one or more times. As shown in 1200, each partition of the data, and each replica of each partition, may be stored in a respective relational database on one or more nodes making up the distributed data store. A partition map may be created that is usable for identifying which of the nodes stores each of the partitions and replicas. The partition map may be stored on one or more nodes of the system, as in 1205. For example, in some embodiments, the partition map is stored locally on each node of the distributed data store, while in other embodiments, the partition map is stored locally only on the nodes on which data associated with the particular namespace is stored, or only on the nodes on which given partitions of the data are stored.

As shown in 1210, a change may be made to at least one of the partitions, which may result in the creation of a new partition map. As described above, partitioning changes may be made for a variety of reasons, including a failure of a computing node or network, performance or service level changes, etc. As illustrated in decision block 1230 of FIG. 11, the method may include determining if a partitioning change should be classified as a major or minor change.

If the change is classified as a minor change, shown as the left exit from decision block 1230, the method may include pushing the new partition map to the affected nodes only, as described above. Examples of minor changes are described herein, and include the promotion of a replica (i.e., read-only) copy of a partition to be a primary (i.e., writable) copy of the partition in the case that the primary copy becomes unreachable. In this example, the new partition map may only be pushed to the nodes in the affected replica group, as in 1240. As described above, the method may not implement a traditional synchronous commit process for applying the new partition map. Instead, operation may continue without waiting for acknowledgement that each of the affected nodes has updated its partition map to reflect the partition change, as shown in 1240. For example, the distributed data store may continue to receive and attempt to execute queries directed to the particular namespace without waiting for such acknowledgment. In this example, the new partition map may eventually be applied to the other nodes in the replica group (i.e., nodes other than the one that implemented the partitioning change) over time, as in 1260. In the meantime, if a query is received at an incorrect node of the replica group because it stores an outdated partition map, the node may receive an error message and/or a new partition map to be applied as needed (e.g., using a pull process). Examples of such pull processes are described herein and illustrated in FIGS. 5, 7, and 8. In addition, if a query is received by another incorrect node (e.g., one outside the affected replica group), a similar pull process may be used to return an error message and/or to propagate and apply the new partition map to that node, as needed. This is shown as 1280.

If the partitioning change of block 1210 is determined to be a major change, shown as the right exit from decision block 1230, the method may include pushing the new partition map to all of the nodes of the distributed data store, as in 1250. In other embodiments, the new partition may be pushed only to the nodes storing at least a portion of the data associated with a given namespace, rather than to all of the nodes in system providing a distributed data store. As described above, operation of the distributed data store may continue without waiting for acknowledgement that locally stored copies of the partition map have been updated to reflect the partition change. Instead, they may be applied to the nodes of the system over time, as in 1270. In the meantime, if a query is received by an incorrect node because of an outdated partition map, a pull process may be used to return an error message and/or to propagate and apply the new partition map to various nodes, as needed. This is shown as 1290.

A common requirement in any shared service infrastructure is that the service should be able to guarantee the promised resource guarantees (e.g., as defined in a service level agreement or other subscriber contract). In a utility computing infrastructure, such as SRDBS, many namespaces may be mapped to the same physical server. Therefore, in some embodiments, mechanisms may be provided to ensure that the variance in workload of one namespace does not affect the observed performance of other namespaces residing in the same server. For example, these isolation mechanisms may prevent a sudden burst in query workload directed to one namespace to monopolize the CPU and/or I/O resources of the system such that the guarantees made to other namespaces are not met.

In some embodiments, resource isolation mechanisms may be included in the query scheduler at the gateway. These mechanisms may in some embodiments ensure that each namespace never consumes more than its promised CPU and I/O workload when there are no spare resources. In other words, these mechanisms may serve as "resource limiters", such that the incoming query load may be throttled up or down based on the amount of resources it is consuming. In some embodiments, such mechanisms may be used to limit the usage of CPU and/or I/O resources to those allocated to a given namespace. In other embodiments, isolation mechanisms may support the incidental or temporary floating of resources above allocated levels (e.g., if authorized to do so in a service agreement), and may notify a client application that the allocated resource levels have been met or exceeded so that it may request an increase in the allocation(s). In some embodiments, a customized utility may be employed to limit the use of these resources within an SRDBS implementation. In other embodiments, in order to limit CPU usage, an SRDBS implementation may employ an existing utility of a commercially available underlying database, such as the Oracle Resource Manager from Oracle, Inc. This utility allows the CPU allocation to different users and queries to be controlled. However, this utility does not currently have the capability to limit I/O resource usage.

In some embodiments, in order to limit I/O resource utilization, functionality may be provided to accurately monitor the I/O usage associated with each subscriber and/or namespace and to throttle their query load up or down such that they do not exceed their assigned I/O operations per second (or IOPS) limit. In one embodiment, SRDBS may employ a custom isolation mechanism to limit the I/O utilization of database applications to a desired limit. This custom solution may include a machine learning technique called "re-enforcement learning" to automatically control the rate of queries made by a given application. Such a solution may in some embodiments be very effective in controlling the I/O utilization of applications for different kinds of workloads.

In some embodiments of SRDBS, such as those described above, the client may be aware of and in charge of routing its queries. These embodiments include rich clients that are aware of the partitioning and routing tables, as described above. In other embodiments, clients may not be aware of or in charge of query routing. In embodiments employing a thin client that is not aware of the partitioning, clients may forward a query to a dedicated set of proxy servers that parse the queries and route them to the gateway for the appropriate databases running in separate database servers.

There may be advantages and disadvantages of each approach, depending on the particular SRDBS implementation and configuration, the number and type of applications, and the workload of those applications. One advantage of the thin client approach may be that in such embodiments clients can be relatively simple, and thereby client interfaces may be easily portable. In such embodiments, clients may interact with the routing tier through simple interfaces such as a Representational State Transfer (REST) call. However, in embodiments that include the thin client approach, each query may incur an additional network hop, as it needs to traverse the routing tier. In addition, hardware load balancers may need to be included to balance the request load across the routing tier, thereby increasing system costs and potentially introducing additional failure modes. Third, the number of connections to gateways may need to be increased in such embodiments, as it may be proportional to the product of the number of users (for each namespace), the number of namespaces, and the number of gateways. This may impose certain limitations on the scale of the databases and the gateway tier. Fourth, since result set concatenation may need to be performed at the gateway servers instead of the clients, queries that span multiple partitions may impose significant computational overhead on the gateways processing such queries. This may impact the latency of (even simple) queries from other clients, thereby resulting in poor performance isolation. In such embodiments, the latency of simple queries may be affected by the performance of other active complex queries currently running in the system (executed by different applications). Finally, repartitioning may be more difficult in such embodiments, as any new partition maps may need to be propagated to all gateway servers, rather than only to the three processes described above in examples that employ a rich client approach (i.e., the gateways involved in the change and the administrative server).

In some embodiments a rich client model may exhibit the advantage that clients will route directly to the correct database replica group without an additional hop due to load balancing or a separate gateway server. In addition, in these embodiments, result set merging may be performed by the client. For simple queries (queries addressing a single partition key) this process may be trivial. For queries that span across partitions, this may be non-trivial. However, an advantage of the rich client model may be that it includes automatic performance isolation, as the aggregation workload imposed by a client may be restricted to the client itself and may not affect the performance of other service clients. In some embodiments, a disadvantage of this approach may be that clients may not be easily portable.

The methods described herein for providing a Scalable Relational Database Service (SRDBS) may be implemented on a wide variety of computing systems using any number of underlying system configurations and data storage architectures, in different embodiments. For example, in some embodiments, SRDBS may be implemented as a service running on one or more computing nodes coupled to each other through wired and/or wireless interfaces according to one or more standard communication protocols. The components making up such a system (e.g., client libraries 140, administrative servers 110, gateway processes 150, and/or database servers 130, or other components configured to implement the functionality of these components as described herein), may be resident on a single computing node or may be distributed across multiple nodes, whether in a single location or in multiple data centers (sites), in different embodiments. SRDBS may in some embodiments be implemented in a computing system that includes an extensible and highly available data processing platform that combines data storage and grid computing capabilities. In one such embodiment, a distributed data storage system underlying SRDBS may include a set of clusters that implement a high-availability database, such as Berkeley DB HA. A computer system that provides SRDBS functionality may interact with client applications and/or with users (subscribers) through a web interface, such as a web services application, in some embodiments. Such an interface may be included in a client library 140, in some embodiments, or may be provided by functionality included in administrative server 110.

Figure 12:
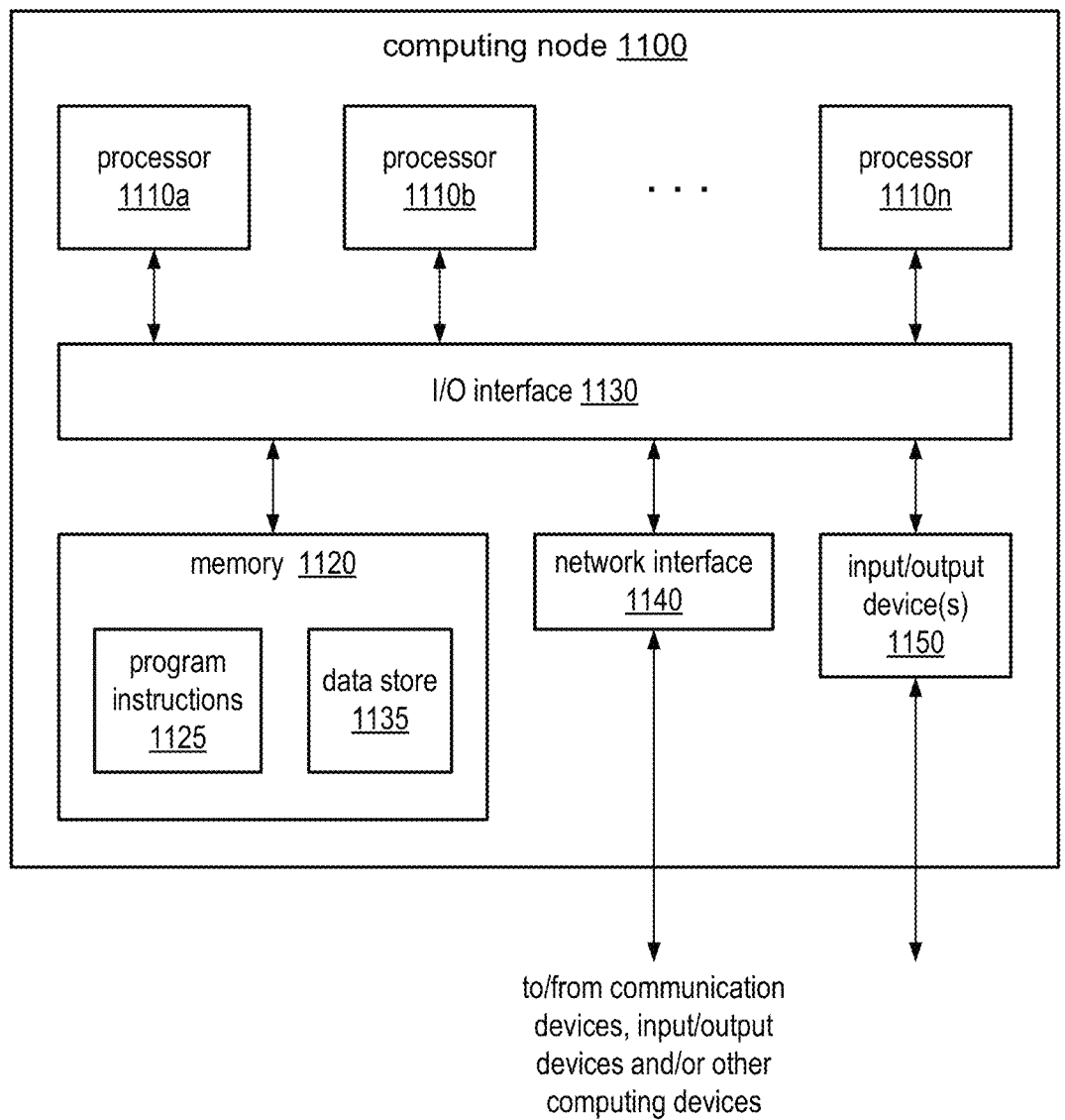
FIG. 12 is a block diagram illustrating one embodiment of a computing node suitable for implementing SRDBS.

One computing node that may be suitable for implementation of SRDBS is illustrated in FIG. 12. Computing node 1100 may include functionality to provide any or all of the components of SRDBS described herein, or multiple computing nodes similar to or different from computing node 1100 may collectively provide this functionality, in different embodiments. For example, in one embodiment, one or more computing nodes 1100 that implement client application servers 120 may also be configured to provide client libraries 140, while in other embodiments, one or more computing nodes 1100 configured to provide administrative servers 110 may also provide client libraries 140. In still other embodiments, client libraries 140 may be provided by one or more other computing nodes 1100 configured to implement a middle tier between application servers 120 and administrative servers 110. Similarly, gateway processes 150 may be provided by one or more computing nodes configured to implement database servers 130, or by one or more computing nodes configured to implement administrative servers 110. In some embodiments that include multiple computing nodes 1100, all of the computing nodes 1100 may include the same or similar hardware components, software components, and functionality, while in other embodiments, the computing nodes 1100 comprising a computing system configured to implement SRDBS may include a wide variety of hardware components, software components, and functionality. Note that while FIGS. 1, 3, and 7 illustrate embodiments in which each client library 140 is associated with a single application server 120, and each gateway 150 is associated with a single database server 130, in other embodiments, these components may have mappings other than this one-to-one correspondence, as described herein.

In the illustrated embodiment, computing node 1100 includes one or more processors 1110 coupled to a system memory 1120 via an input/output (I/O) interface 1130. Computing node 1100 further includes a network interface 1140 coupled to I/O interface 1130, and one or more input/output devices 1150. As noted above, in some embodiments, a given node may implement the functionality of more than one component of SRDBS. In various embodiments a computing node 1100 may be a uniprocessor system including one processor 1110, or a multiprocessor system including several processors 1110 (e.g., two, four, eight, or another suitable number). Processors 1110 may be any suitable processor capable of executing instructions. For example, in various embodiments processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA. Similarly, in a distributed computing system such as that described herein, each of the computing nodes may implement the same ISA, or individual nodes and/or nodes corresponding to a particular replica group may implement different ISAs.

System memory 1120 may be configured to store program instructions and/or data accessible by processor 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 1120 as program instructions 1125 and data storage 1135, respectively. For example, program instruction 1125 may include any or all of an administrative server process (e.g., administrative server 110), a user interface, a web services interface, a load-balancing service, a database server (e.g., database server 130), a distributed database, a gateway process (e.g., gateway 150), a client library (e.g., client library 140), an application server (e.g., application server 120), and a client application.

Data storage 1135 may in various embodiments include collections of data maintained by a relational database system, and/or metadata used by an SRDBS system, as described herein (including, but not limited to, partition maps, routing tables, indexes, namespaces and/or partitions thereof, database schemas, service level agreement parameter values, subscriber preferences and account information, performance data, and resource usage data). In other embodiments, program instructions and/or data as described herein for implementing SRDBS may be received, sent or stored upon different types of computer-accessible media or on similar media separate from system memory 1120 or computing node 1100. Generally speaking, a computer-accessible medium may include storage media or memory media such as magnetic or optical media, e.g., disk or CD/DVD-ROM coupled to computing node 1100 via I/O interface 1130. Program instructions and data stored on a computer-accessible storage medium may be transmitted to a computing node 1100 for execution by a processor 1110a by transmission media or signals such as electrical, electromagnetic, or digital signals, which may be conveyed via a communication medium such as a network and/or a wireless link, such as may be implemented via network interface 1140.

In one embodiment, I/O interface 1130 may be configured to coordinate I/O traffic between processor 1110, system memory 1120, and any peripheral devices in the computing node, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computing node 1100 and other devices attached to a network, such as other computer systems, or between other nodes in system implementing SRDBS. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1150 may, in some embodiments, include one or more display terminals, keyboards, keypads, touchpads, scanning devices, voice or optical recognition devices, or any other devices suitable for entering or retrieving data by one or more computing nodes 1100. Multiple input/output devices 1150 may be present in computing node 1100 or may be distributed on various nodes of a shared resource system or grid computing system. In some embodiments, similar input/output devices may be separate from computing node 1100 and may interact with one or more nodes of a shared resource system through a wired or wireless connection, such as over network interface 1140.

Users may interact with SRDBS in various ways in different embodiments, such as to submit requests for service, query requests, and/or metrics requests, and to receive results. For example, some subscribers to the service may have physical access to computing node 1100, and if so, may interact with various input/output devices 1150 to provide and/or receive information. Alternatively, other users may use client computing systems to access SRDBS, such as remotely via network interface 1140 (e.g., via the Internet and/or the World Wide Web). In addition, some or all of the computing nodes of a system providing the service may provide various feedback or other general types of information to users (e.g., in response to user requests) via one or more input/output devices 1150.

Those skilled in the art will appreciate that computing node 1100 is merely illustrative and is not intended to limit the scope of embodiments. In particular, the computing system and devices may include any combination of hardware or software that can perform the indicated functions, including computers, network devices, internet appliances, PDAs, wireless phones, pagers, etc. Computing node 1100 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage media or devices while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as program instructions or structured data) on a computer-accessible storage medium or a portable article to be read by an appropriate drive, various examples of which are described above. In some embodiments, instructions stored on a computer-accessible storage medium separate from computing node 1100 may be transmitted to computing node 1100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible storage medium. Accordingly, different embodiments may be practiced with other computer system configurations.

Those skilled in the art will appreciate that in some embodiments the functionality provided by the methods discussed above may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

From the foregoing it will be appreciated that, although specific embodiments have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer accessible storage medium, other aspects may likewise be so embodied. Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a memory to store program instructions which, if performed by at least one processor, cause the at least one processor to perform a method to at least:
monitor a plurality of computing nodes that respectively store different partitions of a database as indicated in a partition map for the database to route queries to the plurality of computing nodes;
based, at least in part, on the monitoring of the computing nodes, determine a change to perform to partitioning of the database at one or more of the computing nodes and perform the determined change to partitioning of the database at the one or more computing nodes; and
create a new partition map for the database that includes the change to the partitioning of the database and that is sent to one of the plurality computing nodes; and
allow performance of queries to the database without waiting to receive an acknowledgement from the one computing node that a local partition map at the one computing node is updated to the new partition map.

2. The system of claim 1, wherein to perform the change, the method at least:
splits data of at least one of the partitions into two or more new partitions, merges data of two or more of the partitions into a new partition, or moves data from at least one of the partitions into a new partition; and stores each new partition of the data in a respective one of the plurality of computing nodes or a different computing node.

3. The system of claim 1, wherein the method further comprises detect a change to a Service Level Agreement (SLA) associated with the database, wherein the identification of the change to partitioning the database is based, at least in part, on the change to the SLA.

4. The system of claim 1, wherein the method further comprises:

classify the change to the partitioning of the database;

identify the one computing node to send the new partition map based, at least in part, on the classification of the change; and send the new partition map to the identified computing node.

5. The system of claim 1, wherein the method further comprises determine that the performance of the change to the partitioning of the database is complete; and wherein the creation of the new partition map for the database is performed in response to the determination that the performance of the change to the partitioning of the database is complete.

6. The system of claim 1, wherein the method further comprises reject writes to repartitioned data of the database during the performance of the change to the partitioning of the database.

7. The system of claim 1, wherein the at least one processor is implemented as part of an administrative tier of a database service, wherein the database is a virtual relational database hosted on behalf of a user of the database service, and wherein the monitoring of the computing nodes monitors the performance of the computing nodes to process accesses to the partitions of the virtual relational database.

8. A method, comprising:

monitoring a plurality of computing nodes that respectively store different partitions of a database as indicated in partition map for the database to route queries to the plurality of computing nodes;

based, at least in part, on the monitoring of the computing nodes, determining a change to perform to partitioning of the database at one or more affected computing nodes and performing the determined change to partitioning of the database at the one or more affected computing nodes;

creating a new partition map for the database that includes the change to the partitioning of the database and is sent to one of the plurality of computing nodes; and allowing performance of queries to the database without receiving acknowledgement from the one computing node that a local partition map at the one computing node is updated to the new partition map.

9. The method of claim 8, wherein performing the change comprises:

splitting data of at least one of the partitions into two or more new partitions, merging data of two or more of the partitions into a new partition, or moving data from at least one of the partitions into a new partition; and storing each new partition of the data in a respective one of the plurality of computing nodes or a different computing node.

10. The method of claim 8, further comprising detecting a change to a Service Level Agreement (SLA) associated with the database, wherein the identification of the change to partitioning the database is based, at least in part, on the change to the SLA.

11. The method of claim 8, wherein the method further comprises:

classifying the change to the partitioning of the database;

identifying the one or more of the computing nodes to send the new partition map based, at least in part, on the classification of the change; and sending the new partition map to the identified computing nodes.

12. The method of claim 8, wherein the method further comprises determining that the performance of the change to the partitioning of the database is complete; and wherein the creating of the new partition map for the database is performed in response to the determining that the performance of the change to the partitioning of the database is complete.

13. The method of claim 8, wherein the method further comprises rejecting writes to repartitioned data of the database during the performance of the change to the partitioning of the database.

14. The method of claim 8, wherein the at least one processor is implemented as part of an administrative tier of a database service, wherein the database is a virtual relational database hosted on behalf of a user of the database service, and wherein the monitoring of the computing nodes monitors the performance of the computing nodes to process accesses to the partitions of the virtual relational database.

15. A non-transitory, computer-readable storage medium, storing program instructions that when executed by a computing system, cause the computing system to implement:

monitoring a plurality of computing nodes that respectively store different partitions of a database as indicated in partition map for the database to route queries to the plurality of computing nodes;

based, at least in part, on the monitoring of the computing nodes, determining a change to perform to partitioning of the database at one or more affected computing nodes and performing the determined change to partitioning of the database at the one or more affected computing nodes;

creating a new partition map for the database that includes the change to the partitioning of the database and is sent to one of the plurality of computing nodes; and allowing performance of queries to the database without receiving acknowledgement from the one computing node that a local partition map at the one computing node is updated to the new partition map.

16. The non-transitory, computer-readable storage medium of claim 15, wherein in performing the change, the program instructions cause the computing system to implement:

splitting data of at least one of the partitions into two or more new partitions, merging data of two or more of the partitions into a new partition, or moving data from at least one of the partitions into a new partition; and storing each new partition of the data in a respective one of the plurality of computing nodes or a different computing node.

17. The non-transitory, computer-readable storage medium of claim 15, wherein the program instructions cause the computing system to further implement detecting a change to a Service Level Agreement (SLA) associated with the database, wherein the identification of the change to partitioning the database is based, at least in part, on the change to the SLA.

18. The non-transitory, computer-readable storage medium of claim 15, wherein the program instructions cause the computing system to further implement:
   classifying the change to the partitioning of the database;
   identifying the one computing node to send the new partition map based, at least in part, on the classification of the change; and
   sending the new partition map to the identified computing nodes.

19. The non-transitory, computer-readable storage medium of claim 15,
   wherein the program instructions cause the computing system to further implement determining that the performance of the change to the partitioning of the database is complete; and
   wherein the creating of the new partition map for the database is performed in response to the determining that the performance of the change to the partitioning of the database is complete.

20. The non-transitory, computer-readable storage medium of claim 15, wherein the program instructions cause the computing system to further implement rejecting writes to repartitioned data of the database during the performance of the change to the partitioning of the database.

* * * * *